United States Patent
Shichino

(10) Patent No.: US 10,110,073 B2
(45) Date of Patent: Oct. 23, 2018

(54) POWER TRANSMITTING APPARATUS, CONTROL METHOD OF THE SAME AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Toyko (JP)

(*) Notice: Subject to any disclaimer, the term of this patent is extended or adjusted under 35 U.S.C. 154(b) by 933 days.

(21) Appl. No.: 14/495,271

(22) Filed: Sep. 24, 2014

(65) Prior Publication Data

US 2015/0097433 A1   Apr. 9, 2015

(30) Foreign Application Priority Data

Oct. 9, 2013  (JP) .................. 2013-212353
Aug. 11, 2014 (JP) .................. 2014-163941

(51) Int. Cl.

| H02J 1/14  | (2006.01) |
|---|---|
| H01F 38/14 | (2006.01) |
| H02J 50/80 | (2016.01) |
| H02J 50/40 | (2016.01) |
| H02J 7/00  | (2006.01) |

(Continued)

(52) U.S. Cl.
CPC .............. *H02J 50/80* (2016.02); *H02J 1/14* (2013.01); *H02J 7/0063* (2013.01); *H02J 7/025* (2013.01); *H02J 17/00* (2013.01); *H02J 50/40* (2016.02); *Y10T 307/414* (2015.04)

(58) Field of Classification Search
CPC .. H02J 1/14; H02J 7/0063; H02J 5/005; H02J 7/025; H02J 17/00; H01F 38/14
See application file for complete search history.

(56) References Cited

U.S. PATENT DOCUMENTS 8,391,258 B2  3/2013 Shichino
8,872,383 B2  10/2014 Kozakai
(Continued)

FOREIGN PATENT DOCUMENTS

JP  2010-104103 A   5/2010
JP  2011-19291 A    1/2011
(Continued)

OTHER PUBLICATIONS

Office Action in Japanese Patent Application No. 2014-163941, dated Jul. 2, 2018.

*Primary Examiner* — Rexford Barnie
*Assistant Examiner* — Terrence Willoughby
(74) *Attorney, Agent, or Firm* — Fitzpatrick, Cella, Harper & Scinto

(57) ABSTRACT

A power transmitting apparatus which can be driven by a battery and transmits power to one or more power receiving apparatuses acquires, from each of one or more power receiving apparatuses, information for identifying the power receiving apparatus, and decides the amount of transmission power for each of one or more power receiving apparatuses based on the remaining capacity of the battery and the sum of the allowable amounts of transmission power determined for each of one or more power receiving apparatuses based on the information. The power transmitting apparatus transmits power to one or more power receiving apparatuses in accordance with the decided power amount.

19 Claims, 16 Drawing Sheets

(51) Int. Cl.
*H02J 7/02* (2016.01)
*H02J 17/00* (2006.01)

(56) References Cited

U.S. PATENT DOCUMENTS

| | | | |
|---|---|---|---|
| 2011/0298297 A1 | 12/2011 | van Wageningen et al. | |
| 2013/0170483 A1 | 7/2013 | Shichino | |
| 2013/0221915 A1* | 8/2013 | Son | H02J 7/025 320/108 |

FOREIGN PATENT DOCUMENTS

| | | | |
|---|---|---|---|
| JP | 2012-519460 A | 8/2012 | |
| JP | 2013-127933 A | 6/2013 | |

\* cited by examiner

FIG. 1
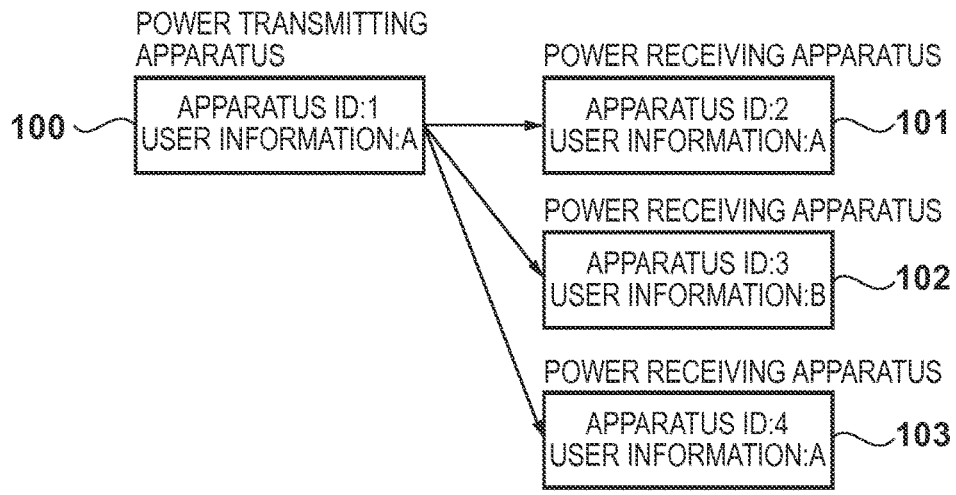
FIG. 2
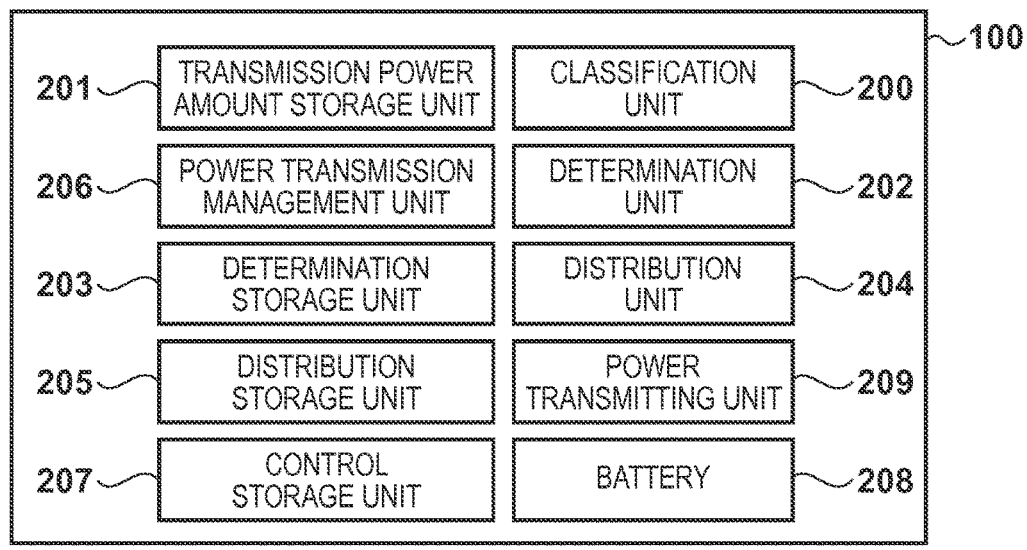
FIG. 3
| CLASS | TRANSMISSION POWER AMOUNT |
|---|---|
| 1 | 10 |
| 0 | 5 |
FIG. 4
| DETERMINATION FLAG | DELETION FLAG |
|---|---|
| 1 | 0 |

FIG. 5A

| APPARATUS ID | CLASS | TRANSMISSION POWER AMOUNT | TRANSMITTED POWER AMOUNT |
|---|---|---|---|
| APPARATUS 2 | 1 | 10 | 0 |
| APPARATUS 3 | 0 | 5 | 0 |

FIG. 5B

| APPARATUS ID | CLASS | TRANSMISSION POWER AMOUNT | TRANSMITTED POWER AMOUNT |
|---|---|---|---|
| APPARATUS 2 | 1 | 7 | 3 |
| APPARATUS 3 | 0 | 2 | 3 |
| APPARATUS 4 | 1 | 10 | 0 |

FIG. 5C

| APPARATUS ID | CLASS | TRANSMISSION POWER AMOUNT | TRANSMITTED POWER AMOUNT |
|---|---|---|---|
| APPARATUS 2 | 1 | 4.5 | 3 |
| APPARATUS 3 | 0 | 0 | 3 |
| APPARATUS 4 | 1 | 7.5 | 0 |

FIG. 6A

| CLASS | CLASSIFIED TRANSMISSION POWER AMOUNT |
|---|---|
| 1 | 10 |
| 0 | 5 |
| TOTAL TRANSMISSION POWER AMOUNT | 15 |
| BATTERY REMAINING CAPACITY | 58 |
| EXPECTED REMAINING CAPACITY | 43 |
| THRESHOLD | 40 |
| NECESSARY REDUCTION AMOUNT | -3 |

FIG. 6B

| CLASS | CLASSIFIED TRANSMISSION POWER AMOUNT |
|---|---|
| 1 | 17 |
| 0 | 2 |
| TOTAL TRANSMISSION POWER AMOUNT | 19 |
| BATTERY REMAINING CAPACITY | 52 |
| EXPECTED REMAINING CAPACITY | 33 |
| THRESHOLD | 40 |
| NECESSARY REDUCTION AMOUNT | 7 |

FIG. 6C

| CLASS | CLASSIFIED TRANSMISSION POWER AMOUNT |
|---|---|
| 1 | 12 |
| 0 | 0 |
| TOTAL TRANSMISSION POWER AMOUNT | 12 |
| BATTERY REMAINING CAPACITY | 52 |
| EXPECTED REMAINING CAPACITY | 40 |
| THRESHOLD | 40 |
| NECESSARY REDUCTION AMOUNT | 0 |

FIG. 7A

| APPARATUS ID | CLASS | REDUCTION AMOUNT | CLASSIFIED REDUCTION AMOUNT | | TOTAL REDUCTION AMOUNT | DIFFERENCE |
|---|---|---|---|---|---|---|
| | | | CLASS 1 | CLASS 0 | | |
| APPARATUS 2 | 1 | 0 | 0 | 2 | 2 | 5 |
| APPARATUS 3 | 0 | 2 | | | | |
| APPARATUS 4 | 1 | 0 | | | | |

FIG. 7B

| APPARATUS ID | CLASS | REDUCTION AMOUNT | CLASSIFIED REDUCTION AMOUNT | | TOTAL REDUCTION AMOUNT | DIFFERENCE |
|---|---|---|---|---|---|---|
| | | | CLASS 1 | CLASS 0 | | |
| APPARATUS 2 | 1 | 2.5 | 5 | 2 | 7 | 0 |
| APPARATUS 3 | 0 | 2 | | | | |
| APPARATUS 4 | 1 | 2.5 | | | | |

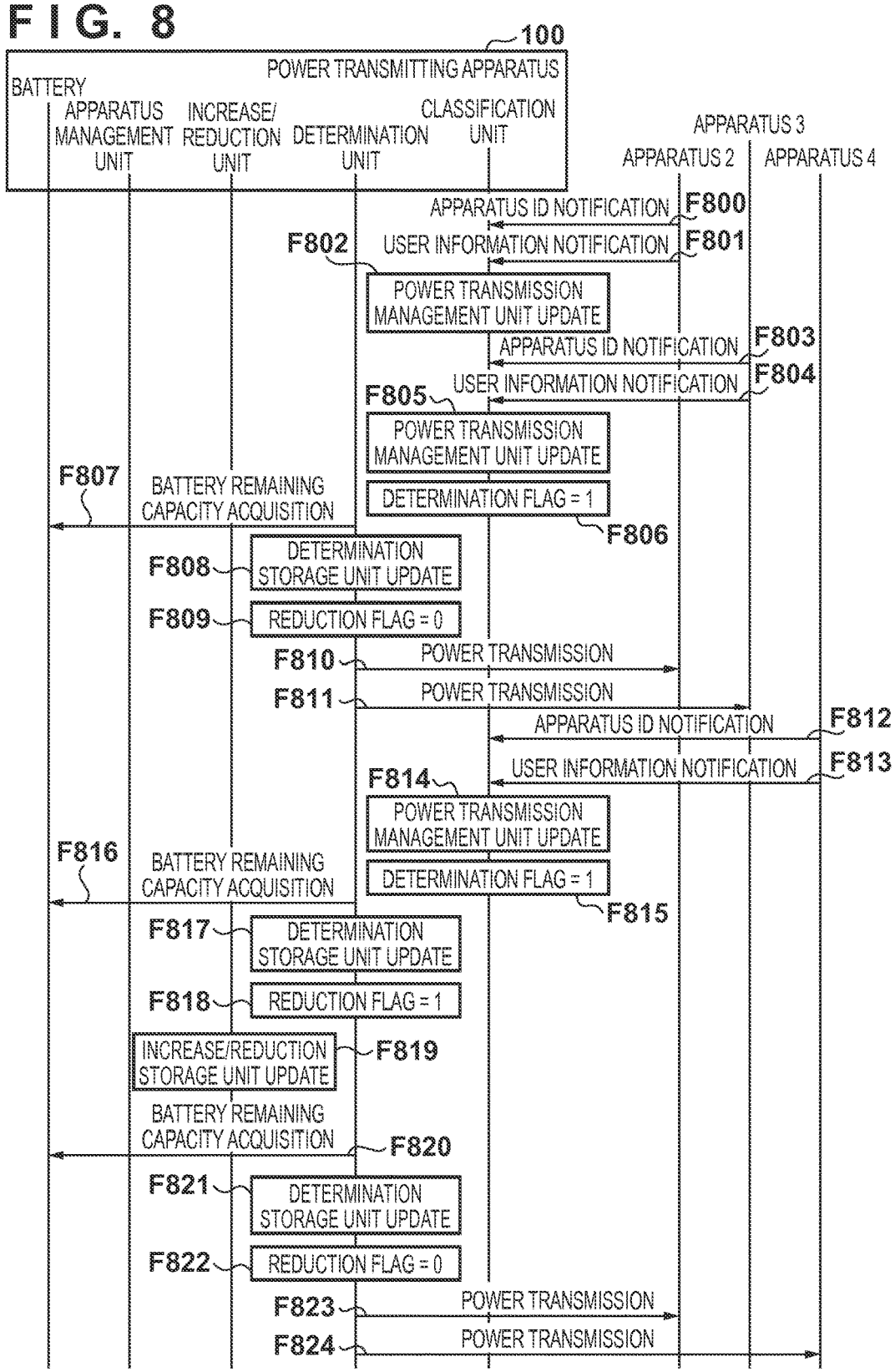

FIG. 12

| 400 | 401 | 1200 |
|---|---|---|
| DETERMINATION FLAG | REDUCTION FLAG | INCREASE FLAG |
| 0 | 0 | 1 |

FIG. 13A

| 1301a | 1302a | 1303a | 1304a |
|---|---|---|---|
| APPARATUS ID | CLASS | TRANSMISSION POWER AMOUNT | TRANSMITTED POWER AMOUNT |
| APPARATUS 2 | 1 | 3.5 | 4 |
| APPARATUS 3 | 0 | 0 | 3 |
| APPARATUS 4 | 1 | 6.5 | 1 |

FIG. 13B

| 1301b | 1302b | 1303b | 1304b |
|---|---|---|---|
| APPARATUS ID | CLASS | TRANSMISSION POWER AMOUNT | TRANSMITTED POWER AMOUNT |
| APPARATUS 2 | 1 | 0 | 4 |
| APPARATUS 3 | 0 | 0 | 3 |
| APPARATUS 4 | 1 | 6.5 | 1 |

FIG. 13C

| 1301c | 1302c | 1303c | 1304c |
|---|---|---|---|
| APPARATUS ID | CLASS | TRANSMISSION POWER AMOUNT | TRANSMITTED POWER AMOUNT |
| APPARATUS 2 | 1 | 0 | 4 |
| APPARATUS 3 | 0 | 1 | 3 |
| APPARATUS 4 | 1 | 9 | 1 |

F I G. 14A

| CLASS | CLASSIFIED TRANSMISSION POWER AMOUNT |
|---|---|
| 1 | 6.5 |
| 0 | 0 |
| TOTAL TRANSMISSION POWER AMOUNT | 6.5 |
| BATTERY REMAINING CAPACITY | 50 |
| EXPECTED REMAINING CAPACITY | 43.5 |
| THRESHOLD | 40 |
| NECESSARY REDUCTION AMOUNT | -3.5 |

F I G. 14B

| CLASS | CLASSIFIED TRANSMISSION POWER AMOUNT |
|---|---|
| 1 | 9 |
| 0 | 1 |
| TOTAL TRANSMISSION POWER AMOUNT | 10 |
| BATTERY REMAINING CAPACITY | 50 |
| EXPECTED REMAINING CAPACITY | 40 |
| THRESHOLD | 40 |
| NECESSARY REDUCTION AMOUNT | 0 |

FIG. 15A

| APPARATUS ID 700a | CLASS 701a | REDUCTION AMOUNT 1500a | CLASSIFIED REDUCTION AMOUNT 1501a | | TOTAL REDUCTION AMOUNT 1502a | TOTAL INCREASE AMOUNT 1503a | DIFFERENCE 1504a |
|---|---|---|---|---|---|---|---|
| | | | CLASS 1 | CLASS 0 | | | |
| APPARATUS 2 | 1 | 0 | 2.5 | 2 | 4.5 | 0 | −3.5 |
| APPARATUS 3 | 0 | 2 | | | | | |
| APPARATUS 4 | 1 | 2.5 | | | | | |

FIG. 15B

| APPARATUS ID 700b | CLASS 701b | REDUCTION AMOUNT 1500b | CLASSIFIED REDUCTION AMOUNT 1501b | | TOTAL REDUCTION AMOUNT 1502b | TOTAL INCREASE AMOUNT 1503b | DIFFERENCE 1504b |
|---|---|---|---|---|---|---|---|
| | | | CLASS 1 | CLASS 0 | | | |
| APPARATUS 2 | 1 | 0 | 0 | 2 | 2 | 2.5 | −1 |
| APPARATUS 3 | 0 | 2 | | | | | |
| APPARATUS 4 | 1 | 0 | | | | | |

F I G. 15C

| APPARATUS ID 700c | CLASS 701c | REDUCTION AMOUNT 1500c | CLASSIFIED REDUCTION AMOUNT 1501c | | TOTAL REDUCTION AMOUNT 1502c | TOTAL INCREASE AMOUNT 1503c | DIFFERENCE 1504c |
|---|---|---|---|---|---|---|---|
| | | | CLASS 1 | CLASS 0 | | | |
| APPARATUS 2 | 1 | 0 | 0 | 1 | 1 | 3.5 | 0 |
| APPARATUS 3 | 0 | 1 | | | | | |
| APPARATUS 4 | 1 | 0 | | | | | |

POWER TRANSMITTING APPARATUS, CONTROL METHOD OF THE SAME AND STORAGE MEDIUM

BACKGROUND OF THE INVENTION

Field of the Invention

The present invention relates to a wireless power transfer technique.

Description of the Related Art

Recently, the development of techniques of wireless power transfer systems is being extensively made. A power transfer system in which a power transmitting apparatus transmits power to a plurality of power receiving apparatuses is described in Japanese Patent Laid-Open No. 2011-019291. Japanese Patent Laid-Open No. 2011-019291 describes that charging is rapidly completed by prolonging the power transmission time for a power receiving apparatus having a high priority level based on priority level information of each power receiving apparatus.

When the power transmitting apparatus is driven by a battery, the battery remaining capacity of the power transmitting apparatus decreases in accordance with power transmission to the plurality of power receiving apparatuses, and a transmittable power amount also decreases. In this case, if the power transmitting apparatus keeps transmitting power to a given power receiving apparatus, it becomes impossible to transmit power to other power receiving apparatuses. If there is a power receiving apparatus for which power transmission is desirably preferentially performed, the battery remaining capacity is reduced by power transmission to other power receiving apparatuses, and this makes it impossible to transmit power to the preferential power receiving apparatus.

The present invention has been made in consideration of the above problem, and controls the amount of transmission power for each power receiving apparatus in accordance with the battery remaining capacity.

SUMMARY OF THE INVENTION

According to one aspect of the present invention, there is provided a power transmitting apparatus drivable by a battery and including a power transmitting unit configured to transmit power to not less than one power receiving apparatus, comprising: an acquisition unit configured to acquire information for identifying each of the not less than one power receiving apparatus; and a decision unit configured to decide an amount of transmission power for each of the not less than one power receiving apparatus, based on a remaining capacity of the battery and an upper limit value of transmission power determined based on the information for each of the not less than one power receiving apparatus, wherein the power transmitting unit transmits power to the not less than one power receiving apparatus in accordance with the decided power amount.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a view showing a system configuration example;

FIG. 2 is a block diagram showing a functional arrangement example of a power transmitting apparatus;

FIG. 3 is a view showing an example of information to be stored in a transmission power amount storage unit;

FIG. 4 is a view showing an example of information to be stored in a control storage unit of the first embodiment;

FIGS. 5A to 5C are views exemplarily showing the transition of information to be stored in a power transmission management unit of the first embodiment;

FIGS. 6A to 6C are views exemplarily showing the transition of information to be stored in a determination storage unit of the first embodiment;

FIGS. 7A and 7B are views exemplarily showing the transition of information to be stored in a distribution storage unit of the first embodiment;

FIG. 8 is a sequence chart showing the procedure of a power transmission process of the first embodiment;

FIG. 12 is a view showing examples of information to be stored in a control storage unit of the second embodiment;

FIGS. 13A to 13C are views exemplarily showing the transition of information to be stored in a power transmission management unit of the second embodiment;

FIGS. 14A and 14B are views exemplarily showing the transition of information to be stored in a determination storage unit of the second embodiment;

FIGS. 15A to 15C are views exemplarily showing the transition of information to be stored in a distribution storage unit of the second embodiment;

DESCRIPTION OF THE EMBODIMENTS

Figure 9:
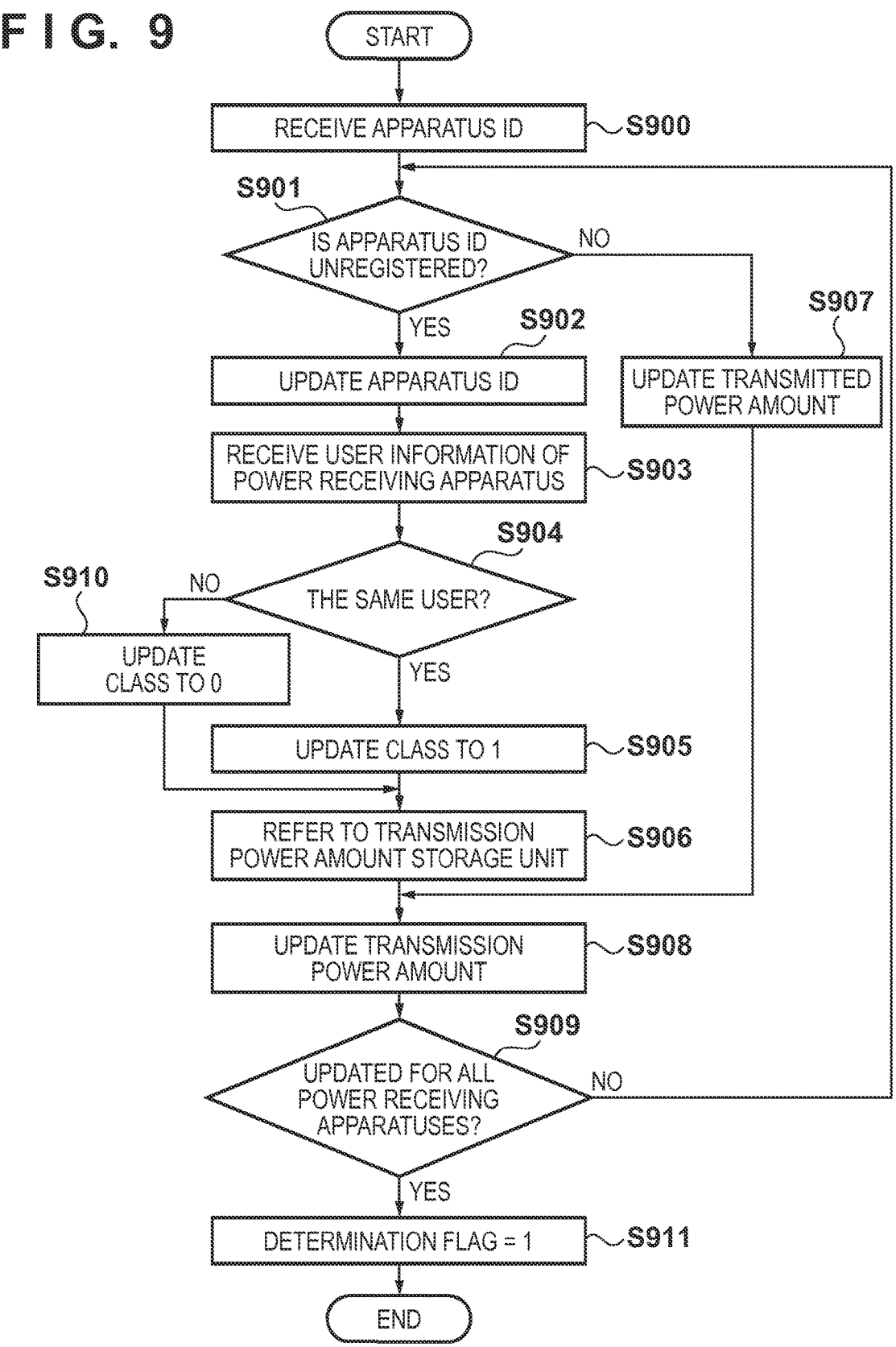
FIG. 9 is a flowchart showing a procedure in a classification unit of the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

System Configuration

FIG. 1 shows a configuration example of a wireless power transfer system according to this embodiment. FIG. 1 shows a system in which one power transmitting apparatus 100 transmits power to three power receiving apparatuses 101 to 103. Each of the power transmitting apparatus and power receiving apparatuses holds an apparatus ID as information for identifying the apparatus and user information of the apparatus. In FIG. 1, the power transmitting apparatus 100 has "1" as the apparatus ID, and "A" as the user information. Likewise, the power receiving apparatus 101 has apparatus ID "2" and user information "A", the power receiving apparatus 102 has apparatus ID "3" and user information "B", and the power receiving apparatus 103 has apparatus ID "4" and user information "A". In the following description, the power receiving apparatuses 101, 102, and 103 will be expressed as apparatuses 2, 3, and 4, respectively. Note that in this embodiment, a case in which a plurality of power receiving apparatuses exist for one power transmitting apparatus 100 will be explained. However, the technique to be explained below can be applied to an arbitrary case in which one or more power receiving apparatuses exist for one power transmitting apparatus 100.

(Arrangement of Power Transmitting Apparatus)

FIG. 2 is a block diagram showing a functional arrangement example of the power transmitting apparatus 100 according to this embodiment. A classification unit 200 classifies the power receiving apparatuses based on the user information of the power receiving apparatuses. In this embodiment, the classification unit 200 classifies a power receiving apparatus having the same user information as that of the power transmitting apparatus as an apparatus represented by identifier "1", and a power receiving apparatus having other user information as an apparatus represented by identifier "0". In the example shown in FIG. 1, the classification unit 200 classifies the power receiving apparatuses having user information A (apparatuses 2 and 4) as apparatuses represented by identifier "1". On the other hand, the classification unit 200 classifies the power receiving apparatus having user information B (apparatus 3) as an apparatus represented by identifier "0".

Note that the classification unit 200 may also use another classification method such as a method of classifying a power receiving apparatus having preregistered predetermined user information as an apparatus represented by identifier "1", and a power receiving apparatus having other user information as an apparatus represented by identifier "0". Also, when the power transmitting apparatus is installed in a store, the user information may be information indicating whether registration pertaining to services provided by the store in which the power transmitting apparatus is installed or by a store management group has been performed. Note that the classification unit 200 may also classify a power receiving apparatus based on the apparatus ID of the power receiving apparatus. The apparatus ID may also be an information element by which the name of a standard with which the power receiving apparatus complies and version information of the standard can be recognized.

In the following explanation, after the power receiving apparatuses are classified, the amount of transmission power to each power receiving apparatus is decided based on the upper limit value of transmission power, which is decided in accordance with the classification, and the remaining capacity of a battery. However, this classification may also be omitted. That is, it is also possible to identify power receiving apparatuses, decide the upper limit value of transmission power for each power receiving apparatus, and decide the amount of transmission power to each power receiving apparatus in accordance with the upper limit value and the remaining capacity of the battery. Furthermore, the user may input information of a power receiving apparatus via an operation unit (not shown) of the power transmitting apparatus, and may also input the upper limit value of transmission power to the power receiving apparatus at the same time. In any case, the power transmitting apparatus sets the upper limit value of transmission power for each power receiving apparatus, and decides the amount of actual transmission power based on the upper limit value and the remaining capacity of the battery.

A transmission power amount storage unit 201 stores the upper limit values of transmission power amounts, which are based on the class classified by the classification unit 200. A determination unit 202 first determines whether it is possible to perform power transmission using the transmission power amount upper limit values stored in the transmission power amount storage unit 201, based on the transmission power amount upper limit values corresponding to the class and the remaining capacity of a battery 208 of the power transmitting apparatus. The determination unit 202 also determines whether the transmission power amount decided for each power receiving apparatus by each processing (to be described later) is appropriate, based on the sum of the transmission power amounts and the battery remaining capacity. Then, in accordance with this determination result, the determination unit 202 determines whether to increase or reduce the transmission power amount for each power receiving apparatus. A determination storage unit 203 stores information to be used in the above-described determination by the determination unit 202. For example, the determination storage unit 203 stores information such as the total amount of power to be transmitted, the battery remaining capacity, and the expected remaining capacity of the battery, which remains after power transmission.

Based on the determination by the determination unit 202, a distribution unit 204 increases or reduces the transmission power amounts to the power receiving apparatuses, and distributes the transmission power within the range of power transmittable to one or more power receiving apparatuses. A distribution storage unit 205 stores the increased/reduced amount of transmission power as a result of the distribution by the distribution unit 204, for each power receiving apparatus, for each class classified by the classification unit 200, and for the whole system. A power transmission management unit 206 manages the transmission power amount decided for each of one or more power receiving apparatuses, and the transmitted power amount.

A control storage unit 207 stores information functioning as triggers by which the determination unit 202 and distribution unit 204 start processing. The determination unit 202 and distribution unit 204 monitor the control storage unit 207. The battery 208 functions as a power supply for driving the power transmitting apparatus 100, and also supplies power to be transmitted to one or more power receiving apparatuses. A power transmitting unit 209 has, e.g., an interface for transmitting power to a power receiving apparatus, and the power transmitting apparatus transmits power to one or more power receiving apparatuses via the power transmitting unit 209.

(Information to be Stored in Transmission Power Amount Storage Unit 201)

FIG. 3 shows examples of information to be stored in the transmission power amount storage unit 201. A class 300 is a class identifier when the classification unit 200 classifies a power receiving apparatuses. A transmission power amount 301 is the upper limit value of the transmission power amount for each class. As will be described in detail later, when the battery remaining capacity is sufficient and presumably equal to or larger than a predetermined value even when power transmission is performed, power equal to this upper limit value is transmitted to a power receiving apparatus. On the other hand, if the battery remaining capacity is insufficient and an expected value of the battery remaining capacity perhaps become less than the predetermined value when power transmission is performed, power lower than this upper limit value is transmitted to a power receiving apparatus. Note that this transmission power amount is, for example, a value obtained by indicating the ratio to the battery capacity by a percentage. Note that numerical values indicating power to be stored in FIGS. 5A to 5C, 6A to 6C, 7A, and 7B (to be described later) are indicated by percentages based on the capacity of the battery 208 as shown in FIG. 3.

In this embodiment as described above, when the class identifier is "1" (to be referred to as "Class 1" hereinafter), the user information of the power receiving apparatus is the same as that of the power transmitting apparatus. When the class identifier is "0" (to be referred to as "Class 0" hereinafter), the user information of the power receiving apparatus is different from that of the power transmitting apparatus. FIG. 3 shows that the transmission power amount 301 for a power receiving apparatus of Class 1 is "10%", so a power amount which is maximally 10% of the battery capacity can be transmitted to this power receiving apparatus. Also, the transmission power amount 301 for a power receiving apparatus of Class 0 is "5%" in FIG. 3. By thus making the transmission power amount 301 of Class 1 larger than that of Class 0, a large amount of power can be transmitted to a power receiving apparatus having the same user information as that of the power transmitting apparatus 100. A power transmission process corresponding to the apparatus status of each power receiving apparatus can be performed by thus setting a priority level to the transmission power amount by the class 300. Note that the identification of a class may be given to indicate the priority level of power transmission to a power receiving apparatus belonging to the class. For example, the priority level may increase as the numerical value of the identifier increases.

(Information to be Stored in Control Storage Unit 207)

FIG. 4 shows examples of information to be stored in the control stage unit 207. A determination flag 400 is set to "1" when the determination unit 202 must determine the appropriateness of the transmission power amount. A reduction flag 401 is set to "1" when the distribution unit 204 must reduce the transmission power amount for each of one or more power receiving apparatuses.

(Information to be Stored in Power Transmission Management Unit 206)

FIGS. 5A to 5C show examples of information to be stored in the power transmission management unit 206. Apparatus IDs 501a to 501c store the identifiers of power receiving apparatuses. Classes 502a to 502c store the class identifiers of the apparatus IDs. Transmission power amounts 503a to 503c store power amounts scheduled to be transmitted to the power receiving apparatuses specified by the apparatus IDs. Transmitted power amounts 504a to 504c store power amounts already transmitted to the power receiving apparatuses specified by the apparatus IDs.

FIG. 5A shows that when this information is stored, apparatus 2 belongs to Class 1, power equivalent to 10% of the battery capacity is scheduled to be transmitted to apparatus 2, and a power amount already transmitted to apparatus 2 is 0%. FIG. 5A also shows that apparatus 3 belongs to Class 0, power equivalent to 5% of the battery capacity is scheduled to be transmitted to apparatus 3, and a power amount already transmitted to apparatus 3 is 0%.

The power transmission management unit 206 updates the stored information when, for example, the already transmitted power amount changes with the elapse of time, or power transmission is to be performed for a new power receiving apparatus. For example, the power transmission management unit 206 updates the stored information from FIG. 5A to FIG. 5B, or FIG. 5B to FIG. 5C.

(Information to be Stored in Determination Storage Unit 203)

FIGS. 6A to 6C are examples of information to be stored in the determination storage unit 203. Classes 600a to 600c are class identifiers. Classified transmission power amounts 601a to 601c each indicate the sum total of transmission power amounts stored in the power transmission management unit 206 for each class. In the case shown in FIG. 5A, for example, only apparatus 2 is a power receiving apparatus of Class 1, and the transmission power amount of apparatus 2 is 10%, so the total value of the transmission power amounts of Class 1 is 10%. Likewise, the total value of the transmission power amounts of Class 0 is 5% (601a). On the other hand, in the case shown in FIG. 5B, apparatuses 2 and 4 are power receiving apparatuses of Class 1, and their transmission power amounts are respectively 7% and 10%, so the total value of the transmission power amounts of Class 1 is 17% (601b).

Total transmission power amounts 602a to 602c are the total values of the classified transmission power amounts 601a to 601c. Accordingly, the total transmission power amount 602a is "15" in FIG. 6A, and the total transmission power amount 602b is "19" in FIG. 6B. Battery remaining capacities 603a to 603c each indicate the remaining capacity of the battery 208. The battery remaining capacities 603a to 603c gradually reduce when power transmission is performed. Expected remaining capacities 604a to 604c are the expected values of the battery remaining capacities when power indicated by the total transmission power amounts 602a to 602c is transmitted, and are values obtained by subtracting the total transmission power amounts 602a to 602c from the battery remaining capacities 603a to 603c.

Thresholds 605a to 605c are the reference values of the battery remaining capacities 603a to 603c when the determination unit 202 determines the necessity of increase/reduction of the transmission power amount. For example, the user may set the thresholds 605a to 605c from the viewpoint of the user-friendliness of the power transmitting apparatus 100 as an electronic apparatus. For example, when the power transmitting apparatus 100 is an electronic apparatus having a high frequency of use, the user can secure a sufficient battery remaining capacity after power transmission by setting the thresholds 605a to 605c at high values. Note that in this embodiment, the thresholds 605a to 605c are set at a predetermined value of "40", and are not changed. However, it is also possible to change the thresholds 605a to 605c during power transmission or the like by, for example, user's setting.

Necessary reduction amounts 606a to 606c are values obtained by subtracting the expected remaining capacities 604a to 604c from the thresholds 605a to 605c. When the sign of the necessary reduction amounts 606a to 606c is 0 or less, the expected remaining capacities 604a to 604c after power transmission are equal to or larger than the thresholds 605a to 605c, so the transmission power amounts need not be reduced. On the other hand, if the values of the necessary reduction amounts 606a to 606c are larger than 0, the expected remaining capacities 604a to 604c after power transmission are smaller than the thresholds 605a to 605c, so the transmission power amounts need to be reduced.

(Information to be Stored in Distribution Storage Unit 205)

FIGS. 7A and 7B show examples of information to be stored in the distribution storage unit 205. FIGS. 7A and 7B show examples in which the distribution storage unit 205 stores only the reduction amounts when the transmission power is reduced. Apparatus IDs 700a and 700b indicate identifiers for identifying power receiving apparatuses. Classes 701a and 701b are class identifiers, and store classes corresponding to the power receiving apparatuses. Reduction amounts 702a and 702b represent reduction amounts decided by the distribution unit 204, and store the reduction amounts of the transmission power corresponding to the power receiving apparatuses.

Classified reduction amounts 703a and 703b each store the sum total of the reduction amounts of each class. For example, in the case shown in FIG. 7A, the transmission power is reduced for only apparatus 3 of Class 0, and the reduction amount 702a of apparatus 3 is 2%, so the classified reduction amount 703a is 0% for Class 1 and 2% for Class 0. On the other hand, in the case shown in FIG. 7B, the transmission power is reduced not only for apparatus 3 but also for apparatuses 2 and 4. Consequently, the sum of the reduction amounts 702b is (2.5%+2.5%=) 5% for Class 1 and 2% for Class 0, so the classified reduction amount 703b is 5% for Class 1 and 2% for Class 0.

Total reduction amounts 704a and 704b are the sum totals of the classified reduction amounts 703a and 703b. Differences 705a and 705b are differences between the necessary reduction amounts 606a to 606c shown in FIGS. 6A to 6C and the total reduction amounts 704a and 704b, and are values obtained by subtracting the total reduction amounts 704a and 704b from the necessary reduction amounts 606a to 606c. That is, it is necessary to further reduce the transmission power by power amounts indicated by the differences 705a and 705b. FIG. 7A shows that the necessary reduction amount 606a is larger by 5 than the total reduction amount 704a, and it is necessary to further reduce the transmission power amount by 5%.

(Power Transmission Process)

Figure 10:
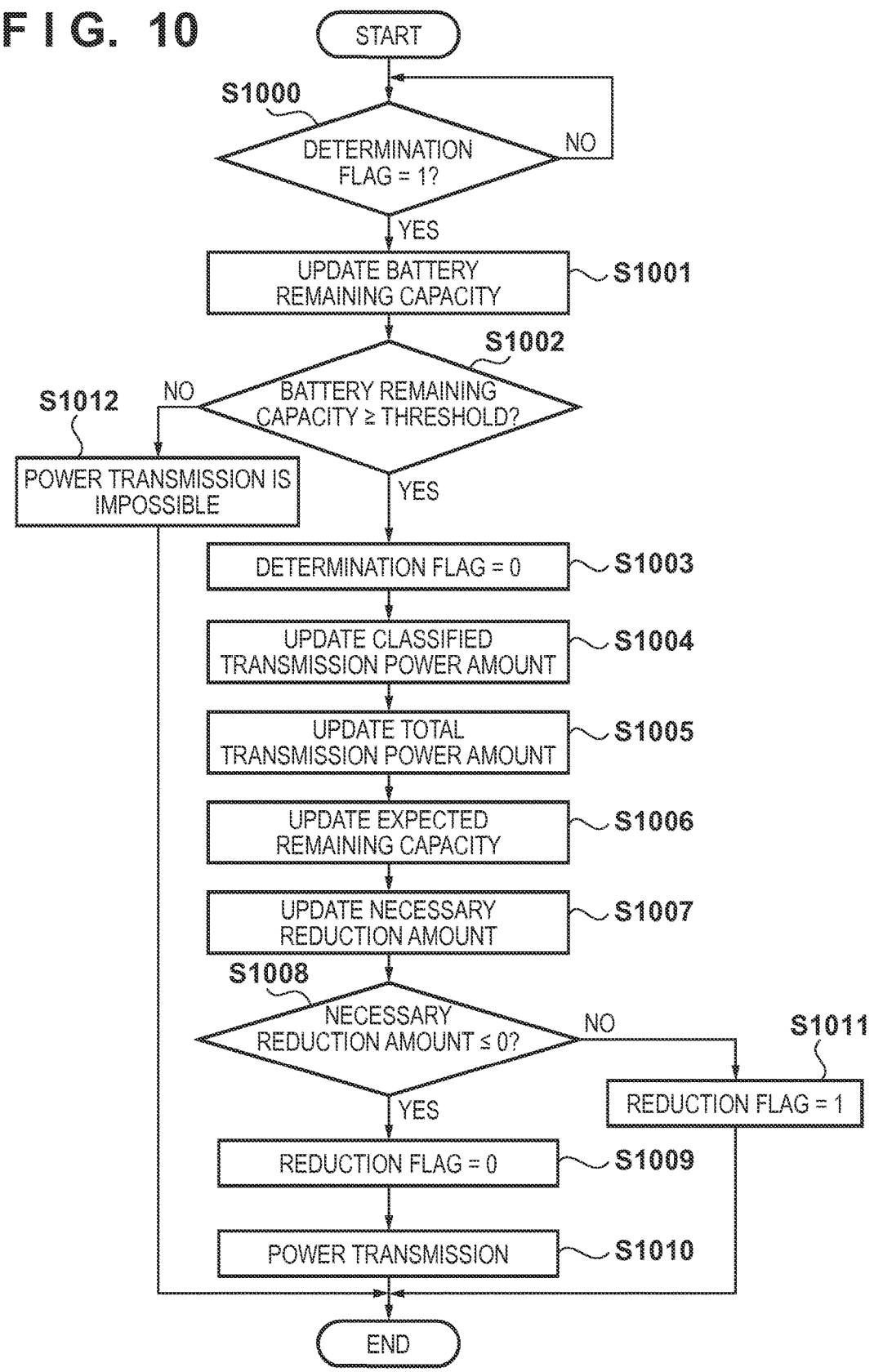
FIG. 10 is a flowchart showing a procedure in a determination unit of the first embodiment.
Figure 11:
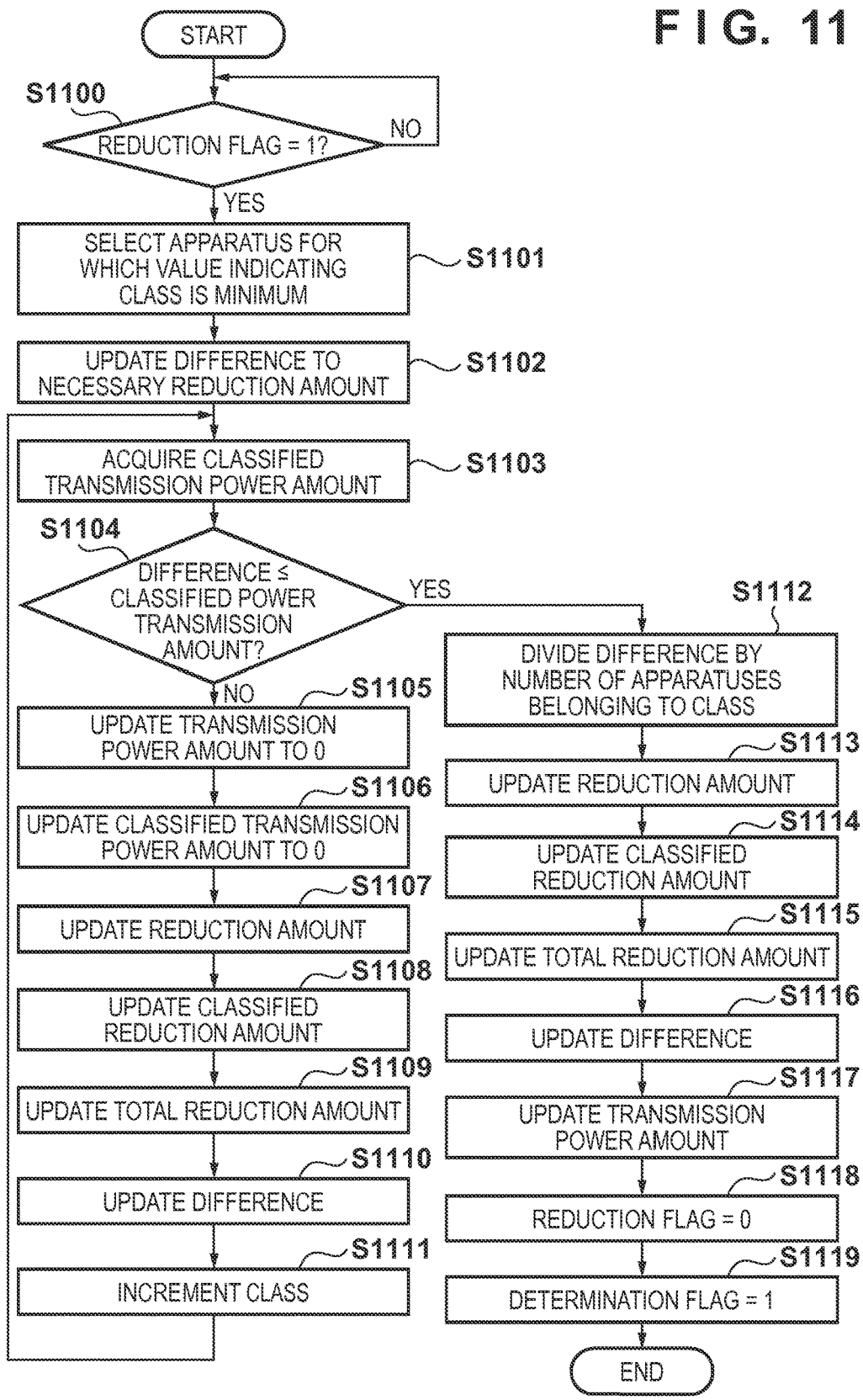
FIG. 11 is a flowchart showing a procedure in a distribution unit of the first embodiment.

Next, a process executed in the wireless power transfer system according to this embodiment will be explained. FIG. 8 is a sequence chart showing the procedure of a power transmission process of this embodiment. FIG. 9 is a flowchart showing a procedure in the classification unit 200. FIG. 9 shows a process in which the classification unit 200 classifies a power receiving apparatus based on the apparatus ID of the power receiving apparatus, sets a transmission power amount corresponding to the class, and urges the determination unit to determine the appropriateness of this transmission power amount. FIG. 10 is a flowchart showing a procedure in the determination unit 202 of this embodiment. FIG. 10 shows a process in which the determination unit 202 determines the appropriateness of a transmission power amount decided based on the battery remaining capacity and each class. FIG. 11 is a flowchart showing a procedure in the distribution unit 204 of this embodiment. FIG. 11 shows a process in which the distribution unit 204 reduces a transmission power amount from a class having a low priority level in accordance with a priority level decided for each class.

When the process is started, the power transmitting apparatus 100 (the classification unit 200) receives a notification of apparatus ID "2" from apparatus 2 via a communication unit (not shown) (F800 and step S900). Upon receiving the notification of the apparatus ID, the classification unit 200 determines whether the apparatus ID is registered in the power transmission management unit 206 (step S901). Assume that at this point of time, the power transmitting apparatus 100 is not transmitting power to any power receiving apparatus, and the apparatus ID of any power receiving apparatus is not registered. Therefore, since apparatus ID "2" is not registered in the power transmission management unit 206 (YES in step S901), the classification unit 200 adds "apparatus 2" to the apparatus ID (501a) and updates the information stored in the power transmission management unit 206 (step S902).

Subsequently, the classification unit 200 receives a notification of the user information from apparatus 2 (F801 and step S903). Note that the user information may also be notified together with the above-described apparatus ID. In this embodiment, the user information of apparatus 2 is "A". The classification unit 200 compares the user information received in F801 with the user information of the power transmitting apparatus 100 (step S904). In this embodiment, the user information of the power transmitting apparatus 100 is "A", so the user information of apparatus 2 matches that of the power transmitting apparatus 100 (YES in step S904). Accordingly, the classification unit 200 updates the class of apparatus 2 to "1" in the information stored in the power transmission management unit 206 (step S905).

Note that a power receiving apparatus is classified in accordance with match or mismatch of the user information in this embodiment, but the present invention is not limited to this. For example, the classification may also be performed in accordance with the apparatus type of a power receiving apparatus, such as power required to drive the apparatus or the chargeability of the apparatus. Alternatively, the classification may be performed in accordance with the group information, apparatus types, apparatus manufacturer information, frequencies of use, or battery remaining amounts of a power transmitting apparatus and power receiving apparatuses, or a combination thereof.

After that, the classification unit 200 refers to the information stored in the transmission power amount storage unit 201 (step S906), and confirms upper limit value "10" of the transmission power amount corresponding to Class 1. Then, the classification unit 200 updates the transmission power amount for apparatus 2 to upper limit value "10" in the information stored in the power transmission management unit 206 (step S908). At this point of time, the update of the power transmission management unit 206, which corresponds to apparatus 2, is complete (F802).

Then, the classification unit 200 determines whether the information stored in the power transmission management unit 206 is updated for all power receiving apparatuses whose apparatus IDs have been notified (step S909). In this example, a notification of the apparatus ID is received from apparatus 3 in F803, so the update of the information about all power receiving apparatuses is not complete (NO in step S909). Therefore, following the same procedure as described above, the classification unit 200 acquires the user information of apparatus 3 (F804), and updates the information of apparatus 3 stored in the power transmission management unit 206 (F805). Note that the user information of apparatus 3 is "B" and does not match the user information of the power transmitting apparatus 100 (NO in step S904), so "0" is stored as a class in the power transmission management unit 206 (step S910). Since the class of apparatus 3 is "0", the transmission power amount for apparatus 3 in the information stored in the power transmission management unit 206 is updated by "5" as the upper limit value of the transmission power amount corresponding to Class 0 stored in the transmission power amount storage unit 201. At this point of time, information stored in the power transmission management unit 206 is as shown in FIG. 5A.

After that, since the update of the information stored in the power transmission management unit 206 is complete for all the power receiving apparatuses whose apparatus IDs have been notified at this point of time (YES in step S909), the classification unit 200 sets the determination flag to "1" (step S911 and F806), and terminates the process.

Note that in this embodiment, the classification unit 200 receives a notification of the apparatus ID from a power receiving apparatus and registers the apparatus ID before transmitting power. However, the present invention is not limited to this. For example, the user of the power transmitting apparatus 100 may input information for specifying the apparatus ID of a power receiving apparatus via an operation unit (not shown), and the classification unit 200 may acquire the apparatus ID and register the apparatus information in the power transmission management unit 206. Note that continuous apparatus ID acquisition after the registration is performed via communication in this case as well.

After that, if the determination flag changes to "1" (YES in step S1000), the determination unit 202 starts the process shown in FIG. 10. The determination unit 202 first acquires the battery remaining capacity from, for example, the battery 208 (F807), and updates the item of the battery remaining capacity in the information stored in the determination storage unit 203 (step S1001). For example, when the acquired battery remaining capacity is 58%, the determination unit 202 sets the battery remaining capacity 603a at "58%" as shown in FIG. 6A.

Then, the determination unit 202 determines whether the battery remaining capacity 603a is equal to or larger than the threshold 605a (step S1002). This determination is executed because no power transmission can be performed if the battery remaining capacity is not exceeding the threshold. Accordingly, if the battery remaining capacity is less than the threshold (NO in step S1002), the determination unit 202 determines that no power transmission can be performed (step S1012), and terminates the whole power transmission process executed by the power transmitting apparatus.

In this embodiment, as shown in FIG. 6A, the battery remaining capacity 603a is 58% at this point of time, and hence is 40% or more of the threshold 605a (YES in step S1002). Note that the power transmitting apparatus has a battery remaining capacity of 58% and has a surplus of 18% compared to 40% of the threshold at this point of time, and hence can transmit 18% of the battery capacity to one or more power receiving apparatuses. Accordingly, the determination unit 202 determines that power can be transmitted to apparatuses 2 and 3. In this stage, the determination unit 202 updates the determination flag 400 of the control storage unit 207 to 0 (step S1003).

Subsequently, the determination unit 202 determines the appropriateness of the transmission power amount 503a in the information stored in the power transmission management unit 206, which is updated by the classification unit 200. First, the determination unit 202 updates information pertaining to the transmission power amount, battery remaining capacity, and necessary reduction amount, of the information stored in the determination storage unit 203 (steps S1004 to S1007). According to FIG. 5A, only apparatus 2 is an apparatus for which the class 502a is 1, and the transmission power amount 503a of apparatus 2 is 10% of the battery capacity. Therefore, the determination unit 202 updates the classified transmission power amount 601a corresponding to Class 1 to "10" in the information stored in the determination storage unit 203 (step S1004). Similarly, according to FIG. 5A, only apparatus 3 is an apparatus for which the class 502a is 0, and the transmission power amount 503a of apparatus 3 is 5% of the battery capacity. Therefore, the determination unit 202 updates the classified transmission power amount 601a corresponding to Class 0 to "5" in the information stored in the determination storage unit 203 (step S1004). Then, the determination unit 202 adds "10" and "5" of the classified transmission power amount 601a, and updates the total transmission power amount 602a as the sum total of the transmission power amounts to be transmitted to the power receiving apparatuses to "15" (step S1005).

Subsequently, based on the battery remaining capacity 603a and total transmission power amount 602a, the determination unit 202 calculates the expected remaining capacity 604a of the battery after power transmission. More specifically, since the battery remaining capacity 603a is 58% and the total transmission power amount 602a is 15% at present, the determination unit 202 subtracts 15 from 58 and updates the expected remaining capacity 604a after power transmission to 43 (step S1006).

Then, the determination unit 202 calculates the necessary reduction amount 606a based on the threshold 605a and expected remaining capacity 604a. In this state, the threshold 605a is 40%, and the expected remaining capacity 604a is 43% at this point of time. Accordingly, the battery remaining capacity expected after power transmission has a surplus of 3% with respect to the threshold 605a. The determination unit 202 updates the necessary reduction amount 606a by "−3" as a result of subtraction of 43 from 40 (step S1007). These processes update the information stored in the determination storage unit 203 (F808).

According to the updated information, the necessary reduction amount 606a is 0 or less (YES in step S1008). Therefore, the determination unit 202 determines that the reduction of the transmission power amount is unnecessary, and updates the reduction flag 401 of the control storage unit 207 to 0 (step S1009 and F809). When the reduction flag 401 is 0, it is possible to directly transmit the transmission power amount stored in the power transmission management unit 206. Based on the transmission power amount 503a stored in the power transmission management unit 206, therefore, the determination unit 202 starts power transmission to apparatuses 2 and 3 via the power transmitting unit 209 (F810 and F811, and step S1010).

Even after power transmission is started, apparatuses 2 and 3 can notify the power transmitting apparatus 100 of the apparatus IDs at a predetermined period. Upon receiving the apparatus IDs (step S900), the classification unit 200 determines whether the apparatus IDs are already registered (step S901). In this case, the apparatus IDs of apparatuses 2 and 3 are already registered, so the classification unit 200 updates the transmitted power amount 504a of each apparatus in the information stored in the power transmission management unit 206 (step S907). Then, the classification unit 200 subtracts the transmitted power amount 504a from the transmission power amount decided before the start of power transmission, and updates the information of the transmission power amount 503a (step S908).

Assume that apparatus 4 notifies the power transmitting apparatus 100 of the apparatus ID when power which is 3% of the battery capacity is transmitted to each of apparatuses 2 and 3 (F812 and step S900). The classification unit 200 updates the information stored in the power transmission management unit 206 by including the information of apparatus 4 based on the flowchart shown in FIG. 9. In the information stored in the power transmission management unit 206, the transmitted power amount 504b of each of apparatuses 2 and 3 is updated to 3 as indicated by the information about apparatuses 2 and 3 shown in FIG. 5B. In addition, as indicated by the information about apparatuses 2 and 3 shown in FIG. 5B, the transmission power amounts 503b are also updated to "7" and "2" obtained by subtracting the respective transmitted power amounts from "10" and "5" as the transmission power amounts decided before the start of power transmission. This demonstrates that power which is 7% of the battery capacity is scheduled to be transmitted to apparatus 2 hereafter, and power which is 2% of the battery capacity is scheduled to be transmitted to apparatus 3 hereafter.

In this state, when the apparatus ID of apparatus 4 is notified, a line indicating that the apparatus ID 501b is "apparatus 4" is added to the information stored in the power transmission management unit 206 (step S902). The classification unit 200 acquires user information "A" of apparatus 4 (step S903). Since this user information matches that of the power transmitting apparatus 100 (YES in step S904), the classification unit 200 updates the class to "1" (step S905). After that, the classification unit 200 refers to the transmission power amount storage unit 201 (step S906), and updates the transmission power amount 503b in the information stored in the power transmission management unit 206 by "10" as the upper limit value of the transmission power amount for apparatus 4 (step S908). After thus updating the information stored in the power transmission management unit 206 (F814), the classification unit 200 sets the determination flag to "1" (step S911 and F815), and terminates the process. When the process is terminated, the information stored in the power transmission management unit 206 is as shown in FIG. 5B.

Note that the update of the information about apparatuses 2 and 3 stored in the power transmission management unit 206 may also be executed when the apparatus ID of apparatus 4 is notified. That is, it is unnecessary to periodically update the apparatus IDs of apparatuses 2 and 3. In this case, after the registration of the information about apparatus 4 is complete, the classification unit 200 may determine whether apparatuses 2 and 3 have been updated (step S909), and update information pertaining to a non-updated apparatus ID (NO in step S909).

Since the determination flag 400 is updated to 1, the determination unit 202 starts determining whether power transmission can be performed by the transmission power amount in the information stored in the power transmission management unit 206 (YES in step S1000). When starting the process, the determination unit 202 acquires the battery remaining capacity from the battery 208 (F816), and updates the battery remaining capacity in the information stored in the determination storage unit 203 (step S1001). At this point of time, the power transmitting apparatus 100 is transmitting power which is 3% of the battery capacity to each of apparatuses 2 and 3, so the battery remaining capacity has become 52% by reducing by 6% from 58% as the battery remaining capacity 603a before the start of power transmission. Accordingly, the determination unit 202 updates the battery remaining capacity 603b to 52 (step S1001). Note that at this point of time, the battery remaining capacity is larger than the threshold (YES in step S1002), and has a surplus of 12% compared to 40% as the threshold.

Subsequently, the determination unit 202 refers to the information (FIG. 5B) stored in the power transmission management unit 206, and determines whether it is really possible to transmit the transmission power amount 503b updated by the classification unit 200. The determination unit 202 first clears the determination flag (step S1003), and then updates the information stored in the determination storage unit 203 (steps S1004 to S1007).

According to FIG. 5B, power receiving apparatuses belonging to Class 1 are two apparatuses 2 and 4, the transmission power amount 503b of apparatus 2 is 7%, and the transmission power amount 503b of apparatus 4 is 10%, so the sum total is 17%. Accordingly, the determination unit 202 updates the classified transmission power amount 601b corresponding to Class 1 to "17" in the information stored in the determination storage unit 203 (step S1004). Also, according to FIG. 5B, only apparatus 3 is an apparatus belonging to Class 0, and the transmission power amount 503b of apparatus 3 is 2%. Therefore, the determination unit 202 updates the classified transmission power amount 601b corresponding to Class 0 to "2" in the information stored in the determination storage unit 203 (step S1004). The determination unit 202 adds "17" and "2" of the classified transmission power amount 601b, and updates the total transmission power amount 602b to "19" (step S1005).

Then, the determination unit 202 calculates the expected remaining capacity 604b after power transmission based on the battery remaining capacity 603b and total transmission power amount 602b. Since the battery remaining capacity 603b is 52% and the total transmission power amount 602b is 19% at present, the determination unit 202 updates the expected remaining capacity 604b after power transmission to "33" as a value obtained by subtracting 19 from 52 (step S1006). After that, the determination unit 202 calculates the necessary reduction amount 606b based on the threshold 605b and expected remaining capacity 604b. Since the threshold 605b is 40% and the expected remaining capacity 604b is 33%, the determination unit 202 subtracts 33 from 40 and updates the necessary reduction amount 606b to 7 (step S1007). This reveals that the expected battery remaining capacity after power transmission is less than the threshold 605a by 7%. At this point of time, the determination unit 202 terminates the update of the determination storage unit (F817).

In this state, the necessary reduction amount 606b is "7", that is, larger than 0 (NO in step S1008), so the determination unit 202 determines that the reduction of the transmission power amount is necessary, and updates the reduction flag 401 to "1" in the information stored in the control storage unit 207 (step S1011 and F818). After that, the determination unit 202 terminates the determination process.

Since the reduction flag 401 is set to "1", the distribution unit 204 starts the process shown in FIG. 11 (YES in step S1100). The distribution unit 204 performs a process of reducing the transmission power amount 503b, in order to reduce the power amount stored in the necessary reduction amount 606b of the determination storage unit 203.

First, the distribution unit 204 selects a class as a target of power reduction. For example, the distribution unit 204 selects a class having the lowest priority level from the viewpoint of power distribution during power transmission. This priority level is a value which is low when the transmission power amount can be small, and is high when a large transmission power amount must be secured. For example, when the priority level increases as the value of the class identifier increases, the distribution unit 204 refers to the information (FIG. 3) stored in the transmission power amount storage unit 201, and selects Class 0 as a minimum value of the class identifier (step S1101). Subsequently, the distribution unit 204 determines whether the necessary reduction amount 606b can be reduced if all transmission power amounts to apparatuses belonging to the selected class are reduced. For this determination, the distribution unit 204 first acquires the value "7" of the necessary reduction amount 606b in the information stored in the determination storage unit 203, and updates the difference to "7" in the information stored in the distribution storage unit 205 (step S1102).

Then, the distribution unit 204 acquires the value "2" of the classified transmission power amount 601b of Class 0 in the information stored in the determination storage unit 203 (step S1103), and compares this value with the value "7" as the difference stored in the distribution storage unit 205 (step S1104). In this case, the difference "7" is larger than the value "2" of the classified transmission power amount 601b (NO in step S1104). This shows that even when the transmission power amount is reduced to 0 for all apparatuses of Class 0, it is necessary to reduce the transmission power amount for another class (in this case, Class 1). In this case, the distribution unit 204 first updates the information of the transmission power amount for Class 0.

As shown in FIG. 5C, the distribution unit 204 updates the transmission power amount 503c corresponding to apparatus 3 in the information stored in the power transmission management unit 206 from "2" of the transmission power amount 503b shown in FIG. 5B to "0" as shown in FIG. 5C (step S1105). Then, as shown in FIG. 6C, the distribution unit 204 updates the classified transmission power amount 601c corresponding to Class 0 in the information stored in the determination storage unit 203 to "0" (step S1106).

In this case, the transmission power amount to apparatus 3 is reduced by 2 from "2" to "0". As shown in FIG. 7A, therefore, the distribution unit 204 updates the reduction amount 702a corresponding to apparatus 3 to "2" in the information stored in the distribution storage unit 205 (step S1107). Also, in accordance with this update of the reduction amount 702a, the distribution unit 204 updates the classified reduction amount 703a of Class 0 to "2" in the information stored in the distribution storage unit 205 (step S1108), and updates the total reduction amount 704a to "2" as the sum total of the classified reduction amounts 703a (step S1109). After that, the distribution unit 204 updates the difference 705a to "5" as a result of the subtraction of "2" of the total reduction amount 704a from "7" stored in step S1102 (step S1110).

At this point of time, the information stored in the distribution storage unit 205 is as shown in FIG. 7A. According to FIG. 7A, the transmission power amount of apparatus 3 belonging to Class 0 is reduced by 2%, and the difference 705a is 5. Accordingly, transmission power equivalent to 5% of the battery capacity, which is indicated by the difference 705a, must be reduced from the transmission power for Class 1. Therefore, the distribution unit 204 increments the class identifier from 0 to 1 (step S1111), and subsequently acquires the value "17" of the classified transmission power amount 601b of Class 1 in the information stored in the determination storage unit 203 (step S1103). Since "17" as the classified transmission power amount 601b of Class 1 is larger than "5" as the difference 705a (YES in step S1104), the process advances to step S1112.

The distribution unit 204 divides the difference 705a by the number of apparatuses belonging to Class 1 (step S1112). According to FIG. 7A, apparatuses belonging to Class 1 are two apparatuses 2 and 4. Therefore, the distribution unit 204 divides "5" as the difference 705a by "2", thereby obtaining "2.5". In accordance with this result, the distribution unit 204 updates the reduction amounts 702b of apparatuses 2 and 4 to "2.5" as shown in FIG. 7B (step S1113). In accordance with this update of the reduction amounts 702b, the distribution unit 204 updates the classified reduction amount 703b of Class 1 to "5" as the sum total of the reduction amounts 702b of the apparatuses of Class 1 as shown in FIG. 7B (step S1114). Also, the distribution unit 204 updates the total reduction amount 704b to "7" as the sum total of the classified reduction amounts 703b (step S1115). Then, the distribution unit 204 updates the difference 705b to "0" as a result of the subtraction of "7" of the total reduction amount 704b from "7" stored in step S1102 (step S1116).

Subsequently, as shown in FIG. 5C, the distribution unit 204 updates the transmission power amounts for apparatuses 2 and 4 to values obtained by subtracting the reduction amounts 702b shown in FIG. 7B, in the information stored in the power transmission management unit 206 from the transmission power amount before reduction (the transmission power amount 503b shown in FIG. 5B) (step S1117). At this point of time, the information stored in the power transmission management unit 206 is as shown in FIG. 5C. FIG. 5C shows that the transmission power amount 503c for apparatus 2 is 4.5%, and the transmission power amount 503c for apparatus 4 is 7.5%. After updating the transmission power amounts, the distribution unit 204 updates the reduction flag 401 to "0" (step S1118), and the determination flag 400 to "1" (step S1119), and terminates the process.

Note that the transmission power amount for a class having a low priority level is reduced to 0 in this embodiment, but this transmission power amount may also be reduced to a predetermined amount. That is, it is also possible to set the lowest power amount of power transmission as a predetermined amount, and, if the reduction amount is insufficient even when the transmission power is reduced to this predetermined amount for a class having a low priority level, reduce the transmission power amount for another class. For example, when the predetermined amount is 0.5%, the transmission power amount of Class 0 may be reduced by 1.5% as a value obtained by subtracting this predetermined amount from the value "2" of the classified transmission power amount of Class 0. For 5.5% as the remainder, the transmission power for Class 1 may be reduced within the range in which the transmission power is 0.5% or more.

In response to the update of the determination flag 400 to "1" (YES in step S1000), the determination unit 202 executes the process shown in FIG. 10 again. First, the determination unit 202 acquires the battery remaining capacity (F820), and updates the value of the battery remaining capacity 603c in the information stored in the determination storage unit 203 (step S1001). Note that if it is detected that the reduction flag 401 is set to "1" and subsequently the determination flag 400 is set to "1", the determination unit 202 need not acquire nor update the battery remaining capacity. This is so because after setting the reduction flag 401 to "1", the distribution unit 204 always sets the determination flag 400 to "1" before actual power transmission, and no large fluctuation probably occurs in the battery remaining capacity during the processing of the distribution unit 204.

Subsequently, the determination unit 202 determines whether power transmission can be performed by the transmission power amount 503c in the information stored in the power transmission management unit 206, which is updated by the classification unit 200. In this case, apparatuses of Class 1 are apparatuses 2 and 4, and, as shown in FIG. 5C, the transmission power amount 503c for apparatus 2 is 4.5%, and the transmission power amount 503c for apparatus 4 is 7.5%, in the information stored in the power transmission management unit 206. As shown in FIG. 6C, therefore, the determination unit 202 updates the classified transmission power amount 601c corresponding to Class 1 to "12" as the sum total of the transmission power amounts 503c of apparatuses 2 and 4, in the information stored in the determination storage unit 203 (step S1004). Also, only apparatus 3 is an apparatus of Class 0, and, as shown in FIG. 5C, the transmission power amount 503c for apparatus 3 is 0% in the information stored in the power transmission management unit 206. As shown in FIG. 6C, therefore, the determination unit 202 updates the classified transmission power amount 601c corresponding to Class 0 to "0" in the information stored in the determination storage unit 203 (step S1004). Then, as shown in FIG. 6C, the determination unit 202 adds "12" and "0" of the classified transmission power amount 601c, and updates the total transmission power amount 602c to "12", in the information stored in the determination storage unit 203 (step S1005).

In addition, the determination unit 202 calculates the expected remaining capacity 604c of the battery after power transmission based on the battery remaining capacity 603c and total transmission power amount 602c. In this case, the battery remaining capacity 603c is 52% and the total transmission power amount 602c is 12% at present, so the determination unit 202 updates the expected remaining capacity 604c after power transmission to "40" (step S1006). Then, the determination unit 202 calculates the necessary reduction amount 606c based on the threshold 605c and expected remaining capacity 604c. Since the threshold 605c is 40% and the expected remaining capacity 604c is 40%, the determination unit 202 updates the necessary reduction amount 606c to "0" (step S1007), and terminates the update of the information stored in the determination storage unit 203 (F821).

Since the necessary reduction amount 606c is 0 or less (YES in step S1008), the determination unit 202 determines that the reduction of the transmission power amount is unnecessary, and sets the reduction flag to "0" (step S1009 and F822). Then, based on the transmission power amount 503c of the power transmission management unit 206, the determination unit 202 starts power transmission to apparatuses 2 and 4 via the power transmitting unit 209 (F823 and F824).

As described above, the power transmitting apparatus 100 according to this embodiment classifies one or more power receiving apparatuses based on the user information of the power receiving apparatuses. Then, based on the upper limit value of the transmission power amount determined based on this class and the battery remaining capacity which changes due to power transmission, the power transmitting apparatus 100 decides power amounts to be transmitted to one or more power receiving apparatuses, and distributes the transmission power. In a wireless power transfer system for transmitting power to one or more power receiving apparatuses, therefore, it is possible to control the transmission power amount for each power receiving apparatus while preventing out-of-battery of the power transmitting apparatus.

Note that the case in which a plurality of power receiving apparatuses exist have been explained above. Even when there is only one power receiving apparatus, however, it is also possible to decide the transmission power amount in accordance with the upper limit value of the transmission power amount to be transmitted to the power receiving apparatus, and the battery remaining capacity. Assume that the class of one power receiving apparatus is 1, the upper limit value of the transmission power amount is 10, the battery remaining capacity of the power transmitting apparatus is 48, and the threshold is 40. In this case, if the power transmitting apparatus transmits a power amount equal to the upper limit value to the power receiving apparatus, the expected value of the battery remaining capacity becomes 38, that is, smaller than the threshold. In this case, therefore, it is possible to decide a transmission power amount so as to transmit a power amount of 8 to the power receiving apparatus.

Second Embodiment

In this embodiment, a case in which apparatus 2 has left the wireless power transfer system shown in FIG. 1 because, for example, apparatus 2 is removed by the user will be explained.

FIG. 12 is a view showing examples of information to be stored in a control storage unit 207. In this embodiment, the controls storage unit 207 stores an increase flag 1200 for increasing a reduced transmission power in accordance with the leaving of a power receiving apparatus from the system, in addition to a determination flag 400 and reduction flag 401. When a power receiving apparatus currently receiving power has left the system, a determination unit 202 writes "1" in the increase flag 1200 in a case in which power scheduled to be transmitted to the power receiving apparatus having left the system is distributed to another power receiving apparatus, and writes "0" in the increase flag 1200 in other cases.

FIGS. 13A to 13C are views showing examples of information to be stored in a power transmission management unit 206 in this embodiment. FIGS. 14A and 14B are views showing examples of information to be stored in a determination storage unit 203 in this embodiment. FIGS. 15A to 15C are views showing examples of information to be stored in a distribution storage unit 205 in this embodiment. The distribution storage unit 205 stores total increase amounts 1503a and 1503b in addition to each information stored in the first embodiment. When a distribution unit 204 has reduced a total reduction amount 1502a, the same value as the reduction of the total reduction amount 1502a is added to the total increase amount 1503a. A difference 1504a is a value obtained by adding the total increase amount 1503a to necessary reduction amounts (1406a and 1406b shown in FIGS. 14A and 14B) of transmission power. The pieces of information shown in FIGS. 13A to 13C, 14A and 14B, and 15A to 15C are updated with the elapse of time, or in accordance with a change in state of the system, as in the first embodiment.

In this embodiment, it is assumed that the system is set in a state after the processes in the first embodiment are performed, and a power transmitting apparatus 100 is transmitting power to apparatuses 2 and 4 based on FIG. 13A. FIG. 13A shows that a transmission power amount 1303a for apparatus 2 is 3.5%, and apparatus 2 is scheduled to receive power transmission which is 3.5% of the battery capacity hereafter. FIG. 13A also shows that the transmission power amount 1303a for apparatus 4 is 7.5%, and apparatus 4 is scheduled to receive power transmission which is 7.5% of the battery capacity hereafter.

Figure 16:
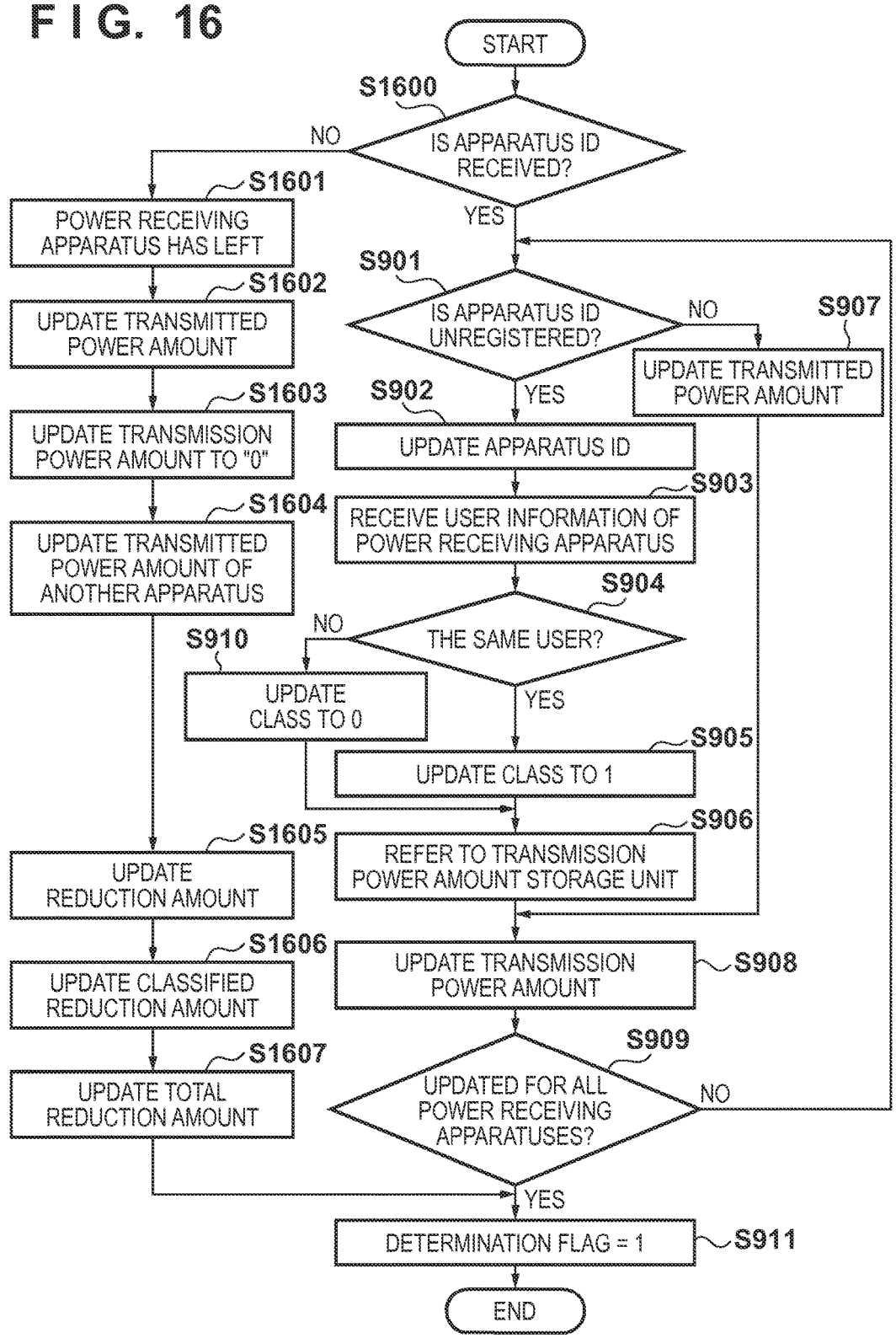
FIG. 16 is a flowchart showing a procedure in a classification unit of the second embodiment.
Figure 17:
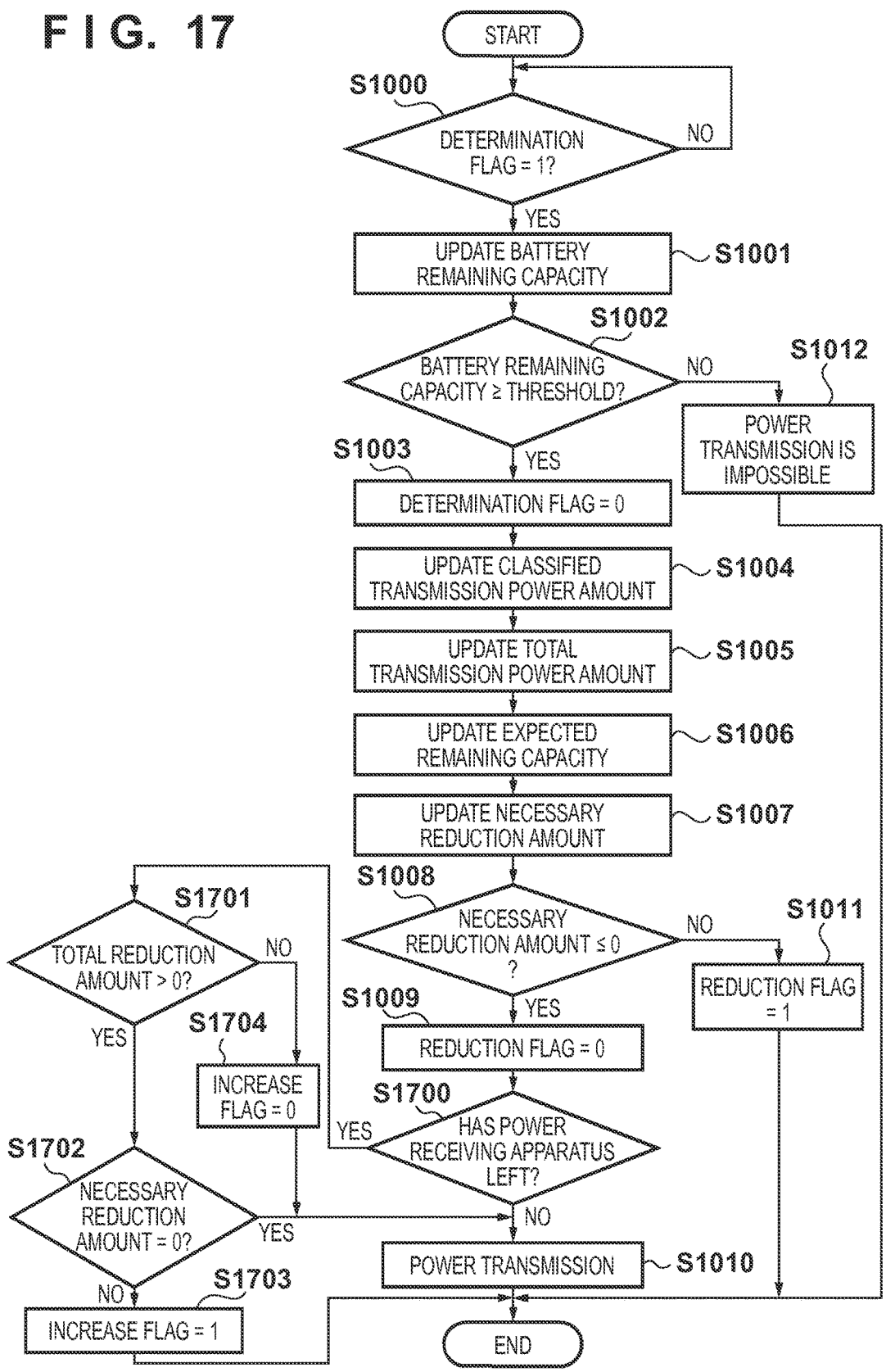
FIG. 17 is a flowchart showing a procedure in a determination unit of the second embodiment.
Figure 18:
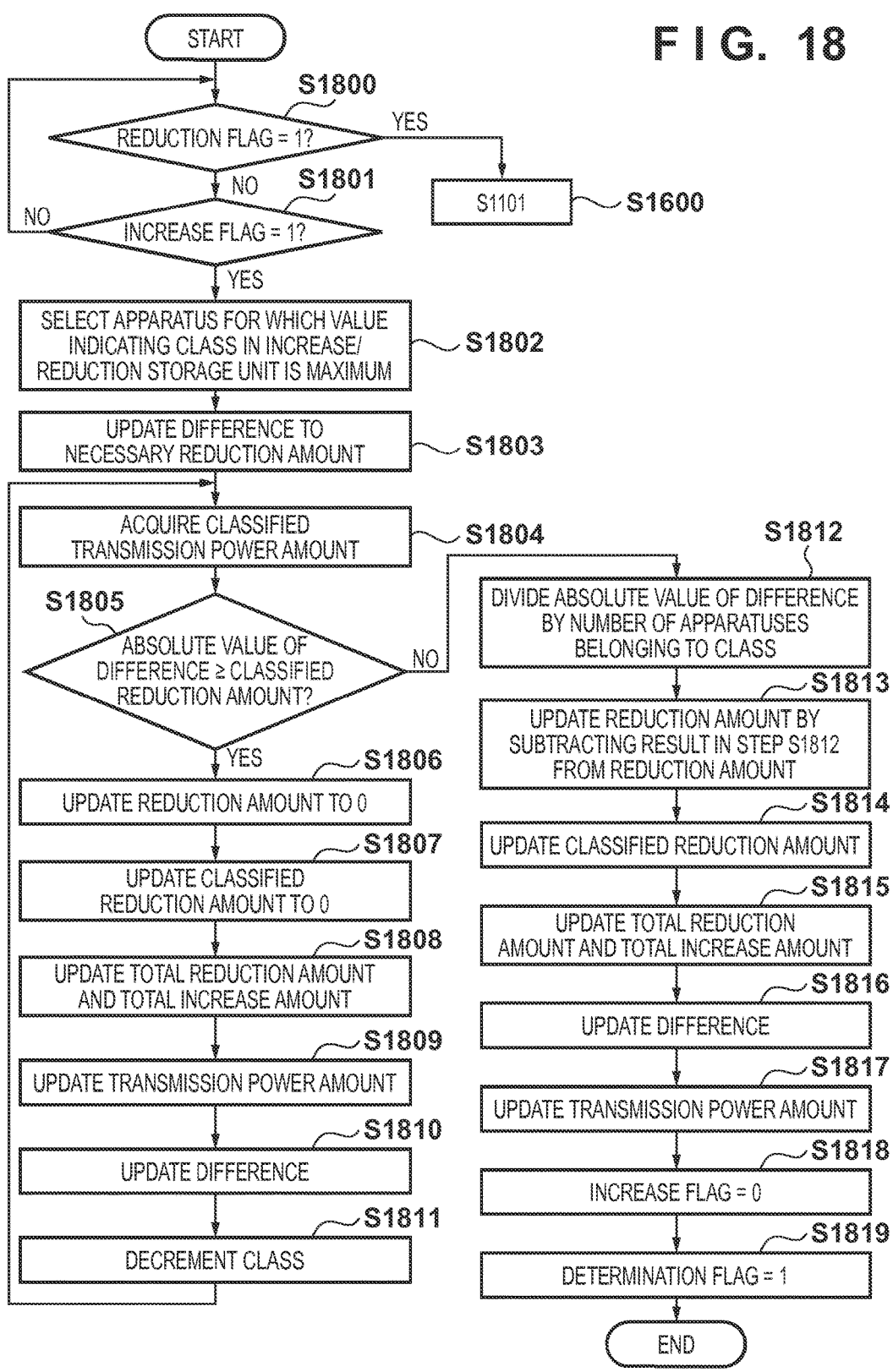
FIG. 18 is a flowchart showing a procedure in a distribution unit of the second embodiment.

Next, each process to be executed in this embodiment will be explained. FIG. 16 is a flowchart showing a procedure in a classification unit 200 of this embodiment. FIG. 17 is a flowchart showing a procedure in the determination unit 202 of this embodiment. FIG. 18 is a flowchart showing a procedure in the distribution storage unit 205 of this embodiment. Note that the same reference numerals as in the first embodiment denote the same portions explained in the first embodiment, and an explanation thereof will be omitted.

First, the processing of the classification unit 200 will be explained. When detecting the leaving of a power receiving apparatus, the classification unit 200 of this embodiment updates the information about the power receiving apparatus stored in the power transmission management unit 206 and distribution storage unit 205. Assume, as described above, that apparatus 2 is removed by the user and hence does not receive power transmitted by the power transmitting apparatus 100 any longer.

The classification unit 200 detects that the apparatus ID of apparatus 2 is no longer received (NO in step S1600), and determines that apparatus 2 has left the system (step S1601). Accordingly, as shown in FIG. 13B, the classification unit 200 updates the transmitted power amount for apparatus 2 in the information stored in the power transmission management unit 206 (step S1602). In this case, a transmitted amount 1304b for apparatus 2 is 4%. The classification unit 200 updates a transmission power amount 1303b for apparatus 2 from "3.5" (1303a) as the transmission power amount before the leaving to "0", in the information stored in the power transmission management unit 206 (step S1603). Then, the classification unit 200 updates the transmitted amounts 1304b of other power receiving apparatuses in the information stored in the power transmission management unit 206 (step S1004). FIG. 13B shows the information stored in the power transmission management unit 206 at this point of time. As shown in FIG. 13B, at this point of time, the power transmitting apparatus 100 is scheduled to transmit power which is 6.5% of the battery capacity to only apparatus 4. Thus, the classification unit 200 completes the update of the information stored in the power transmission management unit 206.

Then, the classification unit 200 updates the information stored in the distribution storage unit 205. Since the information obtained when the processes in the first embodiment are completed is stored in the distribution storage unit 205 at this point of time, this information is as shown in FIG. 7B. The classification unit 200 updates this information in accordance with the leaving of apparatus 2.

The classification unit 200 updates a reduction amount 1500a of apparatus 2 to 0 (step S1605), and updates a classified reduction amount 1501a corresponding to Class 1 to 2.5 as the sum total of the reduction amounts 1500a of apparatuses 2 and 4 (step S1606). Subsequently, the classification unit 200 updates a total reduction amount 1502a to 4.5 as the sum total of the classified reduction amounts 1501a (step S1607). After that, the classification unit 200 updates a determination flag 400 of the control storage unit 207 to "1" (step S911), and terminates the process.

Since the determination flag is updated to "1" (YES in step S1000), the determination unit 202 starts the process shown in FIG. 17. First, the determination unit 202 acquires the battery remaining capacity from a battery 208, and updates the information (FIG. 14A) stored in the determination storage unit 203 (step S1001). Note that the battery remaining capacity is 50% of the battery capacity as indicated by a battery remaining capacity 1403a shown in FIG. 14A. Subsequently, the determination unit 202 acquires a Class 1302b and the transmission power amount 1303b from the information (FIG. 13B) stored in the power transmission management unit 206, and updates the information stored in the determination storage unit 203.

According to FIG. 13B, the transmission power amount 1303b for apparatus 4 belonging to Class 1 is 6.5, and the transmission power amount 1303b for apparatus 3 belonging to Class 0 is 0. As shown in FIG. 14A, therefore, the determination unit 202 updates a classified transmission power amount 1401a of Class 1 to "6.5", and the classified transmission power amount 1401a of Class 0 to "0" (step S1004). Then, the determination unit 202 updates a total transmission power amount 1402a to "6.5" as the sum total of the classified transmission power amounts 1401a (step S1005). After that, the determination unit 202 subtracts the total transmission power amount 1402a from the battery remaining capacity 1403a, and updates an expected remaining capacity 1404a to "43.5" as the subtraction result (step S1006). The determination unit 202 subtracts 43.5 of the expected remaining capacity 1404a from 40 as a threshold 1405a, and updates the necessary reduction amount 1406a to "−3.5" (step S1007). FIG. 14A shows the information stored in the determination storage unit 203 at this point of time. The necessary reduction amount 1406a shown in FIG. 14A demonstrates that it is expected that there is a surplus of 3.5% with respect to the threshold when power transmission is complete.

Then, the determination unit 202 determines, by a subsequent flow, whether this power of 3.5% needs to be distributed to another apparatus. First, the determination unit 202 determines whether there is leaving of a power receiving apparatus from the system (step S1700). Since apparatus 2 has left the system (YES in step S1700), the determination unit 202 determines whether the total reduction amount 1502a is larger than 0 (step S1701). That is, the determination unit 202 determines whether there is an apparatus for which the transmission power amount is reduced at this point of time. If the total reduction amount is larger than 0, the above-described surplus power can be distributed to an apparatus for which the transmission power amount is reduced.

If the total reduction amount is larger than 0 (YES in step S1701), the determination unit 202 determines whether the necessary reduction amount is 0 (step S1702). If the necessary reduction amount is 0 (YES in step S1702), there is no surplus power described above, so the determination unit 202 starts power transmission without performing any power redistribution (step S1010). On the other hand, if the necessary reduction amount is not 0 (NO in step S1702), there is a surplus power, so the determination unit 202 sets the increase flag 1200 to "1" (step S1703), and terminates the process.

In this example, the total reduction amount 1502a is 4.5 (YES in step S1701), and the necessary reduction amount 1406a is "−3.5" (NO in step S1702). Accordingly, the determination unit 202 sets the increase flag 1200 to 1 (step S1703), and terminates the process.

If the reduction flag 401 is 0 (NO in step S1800) and the increase flag 1200 is 1 (YES in step S1801), the distribution unit 204 starts the process shown in FIG. 18. The distribution unit 204 of this embodiment preferentially distributes surplus power to an apparatus belonging to a high-priority-level class, that is, Class 1 as a class having a large class ID.

First, the distribution unit 204 selects apparatus 4 of Class 1 having a maximum value indicating class 701a from the information (FIG. 15A) stored in the distribution storage unit 205 (step S1802).

Also, in the information stored in the distribution storage unit 205, the distribution unit 204 updates the difference 1504a to "−3.5" of the necessary reduction amount 1406a in the information stored in the determination storage unit 203 (step S1803). At this point of time, the information stored in the distribution storage unit 205 is as shown in FIG. 15A.

The distribution unit 204 acquires 2.5 as the classified reduction amount 1501a of Class 1 (step S1804), and compares this value with 3.5 as the absolute value of the difference 1504a (step S1805). The absolute value of the difference 1504a represents a surplus of the power. The classified reduction amount 1501a of Class 1 is 2.5, that is, smaller than 3.5 as the absolute value of the difference 1504a (NO in step S1805). Therefore, the distribution 204 updates the reduction amount of apparatus 4 corresponding to Class 1 from "2.5" to "0" (step S1806), and updates the classified reduction amount corresponding to Class 1 to 0 by reducing the value by 2.5 (step S1807).

When the reduction amount of apparatus 4 is reduced by 2.5 by the processing in step S1806, this means that the transmission power amount of apparatus 4 is increased by 2.5. Accordingly, the distribution unit 204 updates the total increase amount by increasing it from 0 by 2.5 as the reduction amount reduced by the processing in step S1806, and updates the total reduction amount by reducing it from 4.5 to 2 as the sum total of the classified reduction amounts (step S1808). At this point of time, the information stored in the distribution storage unit 205 is as shown in FIG. 15B.

Subsequently, in the information stored in the power transmission management unit 206, the distribution unit 204 updates the transmission power amount of apparatus 4 to "9" as a result of the addition of 6.5 as a preceding value and 2.5 as the reduction amount reduced in step S1806 (step S1809). Then, in the information stored in the determination storage unit 203, the distribution unit 204 updates the classified transmission power amount to "9" as a result of the addition of 6.5 as a preceding value and 2.5 as the reduction amount reduced in step S1806 (step S1809). After that, the distribution unit 204 updates the total transmission power amount to "9" as the sum total of the classified transmission power amounts. Note that the transmission power amount for Class 0 is 0 at this point of time, so "9" as a result of the addition of 0 and 9 is stored as the total transmission power amount.

Then, in the information stored in the determination storage unit 203, the distribution unit 204 updates the value of the difference to "−1" as a result of the addition of "2.5" as the total increase amount 1503b to "−3.5" as a preceding value of the necessary reduction amount 1406a (step S1810). After that, the distribution unit 204 decrements the class from Class 1 to Class 0 (step S1811).

Subsequently, the distribution unit 204 acquires "2" as the classified reduction amount 1501b of Class 0 (step S1804), and compares this value with "1" as the absolute value of the difference 1504b (step S1805). Since the absolute value of the difference 1504b is smaller than the classified reduction amount 1501b of Class 0 (NO in step S1805), the distribution unit 204 divides "1" as the absolute value of the difference 1504b by the number of apparatuses belonging to Class 0 (in this case, the number is "1" because there is only one apparatus 3) (step S1812). This division result in step S1812 corresponds to the power amount to be added to the transmission power amount of an apparatus belonging to Class 0.

Subsequently, the distribution unit 204 subtracts "1" as the division result in step S1812 from "2" as the reduction amount 1500b of apparatus 3 corresponding to Class 0, and updates the reduction amount by "1" as a result of the subtraction in the information stored in the distribution storage unit 205 (step S1813). After that, the distribution unit 204 updates the classified reduction amount corresponding to Class 0 (step S1814) in accordance with the update of the reduction amount. Then, the distribution unit 204 updates the total reduction amount to "1" as the sum total of the classified reduction amounts, and updates the total increase amount to "3.5" as a result of the addition of "1" obtained by the subtraction in step S1813 and "2.5" as a preceding value of the total increase amount 1503b (step S1815). Also, the distribution unit 204 updates the difference to "0" obtained by adding "3.5" as the total increase amount updated in step S1815 to "−3.5" as the necessary reduction amount 1406a in the information stored in the determination storage unit 203 (step S1816). At this point of time, the information stored in the distribution storage unit 205 is as shown in FIG. 15C.

Then, in the information stored in the power transmission management unit 206, the distribution unit 204 updates the transmission power amount of apparatus 3 to "1" obtained by adding "1" as a result in step S1812 to "0" as a preceding value of the transmission power amount 1303b (step S1817). At this point of time, the information stored in the power transmission management unit 206 is as shown in FIG. 13C.

After that, the distribution unit 204 clears the increase flag to 0 (step S1818), and updates the determination flag to 1 (step S1819).

In response to the update of the determination flag 400 to 1, the determination unit 202 executes the process shown in FIG. 17 again, and updates the information stored in the determination storage unit 203 (steps S1003 to S1007). First, the determination unit 202 refers to the information stored in the power transmission management unit 206 shown in FIG. 13C, and updates the classified transmission power amount to "9" for Class 1, and "1" for Class 0 (step S1004). Then, the determination unit 202 updates the total transmission power amount by "10" as the total sum of these classified transmission power amounts (step S1005). The determination unit 202 subtracts "10" as the updated total transmission power amount from "50" as the battery remaining capacity 1403b which is confirmed beforehand, and updates the expected remaining capacity after the completion of power transmission to "40" as a result of the subtraction (step S1006). Furthermore, the determination unit 202 subtracts "40" as the updated expected remaining capacity from "40" as a predetermined threshold, and updates the necessary reduction amount to "0" (step S1007). At this point of time, the information stored in the determination storage unit 203 is as shown in FIG. 14B.

In this state, the necessary reduction amount 1406b is "0" in the information shown in FIG. 14B (YES in step S1008 and YES in step S1702), apparatus 2 has left the system (YES in step S1700), and the total reduction amount 1502c is "1" in the information shown in FIG. 15C (YES in step S1701). Therefore, the determination unit 202 starts power transmission based on the transmission power amount for each apparatus stored in the power transmission management unit 206.

In this embodiment as described above, a surplus power produced when the number of power receiving apparatuses decreases is distributed to another power receiving apparatus for which the transmission power amount is reduced. This makes it possible to transmit power as much as possible within the range not exceeding the upper limit value for each terminal. Also, when the transmission power is increased in order from a power receiving apparatus having a high priority level, it is possible to preferentially transmit sufficient power to a power receiving apparatus to which more power is to be transmitted.

Third Embodiment

In this embodiment, a case in which a power transmitting apparatus includes a power receiving unit (not shown) in addition to the configuration of the first or second embodiment will be explained. This power receiving unit receives, from a power supply source (not shown), the supply of power for the power transmitting apparatus to operate and power to be transmitted to power receiving apparatuses. In this embodiment, a case in which the power supply source is an adapter (external power supply) which converts the commercial AC voltage into a DC voltage will be explained. However, another power transmitting apparatus of a wireless power transfer system may also be a power source.

Figure 19:
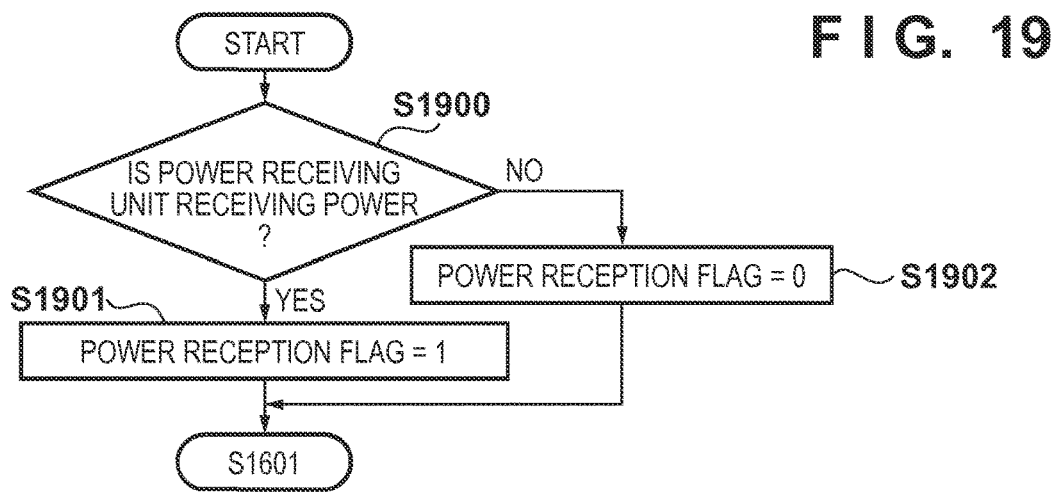
FIG. 19 is a flowchart showing a procedure in a power receiving unit of the third embodiment.
Figure 20:
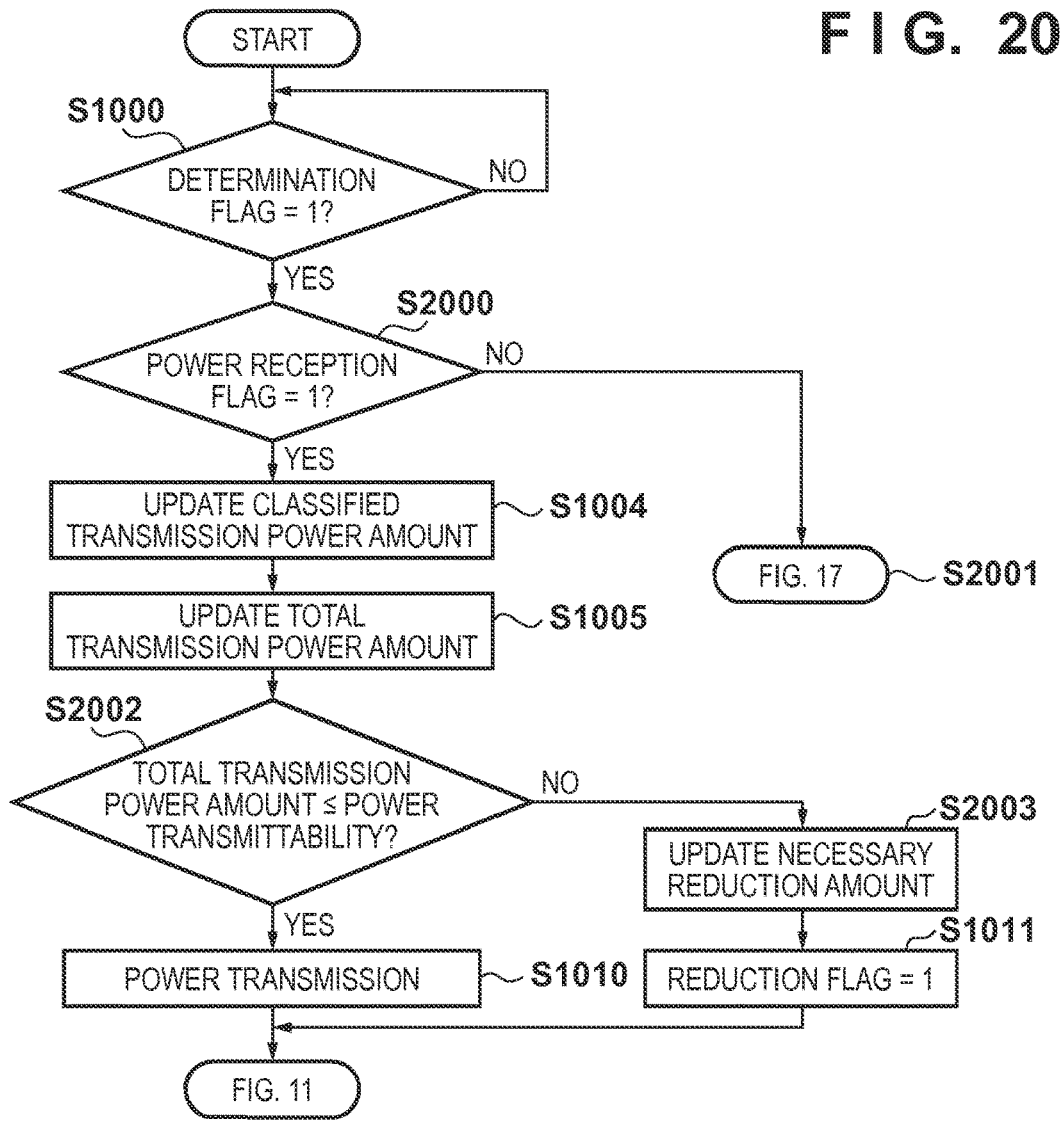
FIG. 20 is a flowchart showing a procedure in a determination unit of the third embodiment.

A procedure in the power transmitting apparatus according to this embodiment will be explained. FIG. 19 shows a procedure in the power receiving unit, and FIG. 20 shows a procedure in a determination unit. Note that in the following explanation, the procedures are performed by adding them to the arrangement of the second embodiment. However, the processes may also be performed by adding them to the arrangement of the first embodiment.

The power receiving unit monitors whether the power receiving unit is receiving power (step S1900). If the power receiving unit is receiving power (YES in step S1900), the power receiving unit sets a power reception flag to 1 (step S1901). On the other hand, if the power receiving unit is not receiving power (NO in step S1900), the power receiving unit sets the power reception flag to 0 (step S1902). For example, when power transmission is performed by using the power of a battery (step S1010 in FIG. 17), the power receiving unit determines NO in step S1900. When the adapter is connected and the power receiving unit starts receiving power supply, the power receiving unit determines YES in step S1900. After that, the power transmitting apparatus advances to the processing in step S1601 again, and a classification unit updates the transmission power amounts for all power receiving apparatuses.

When the processing of the classification unit is complete, the determination unit determines whether the power reception flag is 1 (step S2000). If the power reception flag is 1 (YES in step S2000), that is, if the power receiving unit is receiving power, the determination unit executes steps S1004 and S1005 described previously, and compares the total transmission power amount with the power transmittability of a power transmitting unit (step S2002). If the power transmittability is equal to or larger than the total transmission power amount (YES in step S2002), the determination unit switches the supply sources of power to be supplied to the power transmitting unit from the battery to the power receiving unit by operating a switch (not shown), and performs power transmission.

On the other hand, if the power transmittability is smaller than the total transmission power amount (NO in step S2002), the determination unit updates the necessary reduction amount (step S2003). This necessary reduction amount has a value obtained by subtracting the power transmittability from the total transmission power amount. Subsequently, the determination unit updates the reduction flag to 1 and terminates the process, and the process of a distribution unit shown in FIG. 11 is executed after that. When the process of the distribution unit shown in FIG. 11 is complete, the procedure advances to the process shown in FIG. 20 again, and the determination unit performs the operation. Note that the process shown in FIG. 19 performed by the power receiving unit may be executed periodically or continuously, and may also be executed before the operation of the determination unit.

In this embodiment as described above, when the power transmitting apparatus is receiving the supply of power, the supply sources of power to be supplied to the power transmitting unit are switched from the battery to the power receiving unit. In this case, the necessary reduction amount is calculated not from the battery remaining capacity and total transmission power amount but from the power transmittability and total transmission power amount. By thus receiving the supply of power, the power transmitting apparatus can transmit power to power receiving apparatuses without reducing the battery remaining capacity. In addition, the power transmitting apparatus can perform power transmission by using the power transmittability as the upper limit, without taking account of the battery remaining capacity.

Next, a case in which the power receiving unit changes from a power-receiving state to a non-power-receiving state will be explained. Due to this change, the power receiving unit determines NO in step S1900, and sets the power reception flag to 0 (step S1902). Since the power reception flag is not 1, the determination unit determines NO in step S2000, and performs power transmission by switching the supply sources of power to the power transmitting unit from the power receiving unit to the battery by using the switch (not shown). Then, the procedure advances to the process shown in FIG. 17 (step S2001). In the arrangement of this embodiment as described above, the supply sources of power to the power transmitting unit are switched between the battery and power receiving unit in accordance with whether the power receiving unit is receiving power. This makes it possible to appropriately transmit power to power receiving apparatuses.

The present invention can control the amount of transmission power for each power receiving apparatus in accordance with the battery remaining capacity in wireless power transfer.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-212353, filed Oct. 9, 2013 and 2014-163941, filed Aug. 11, 2014, which are hereby incorporated by reference herein in their entirety.

What is claimed is:

1. A power transmitting apparatus, comprising:
   a battery;
   a power transmitting unit configured to transmit power to one or more power receiving apparatus using power from the battery;
   at least one processor; and
   a memory,
   wherein the at least one processor is configured, by executing computer executable instructions stored in the memory, to:
      acquire user information for identifying a user from each of the one or more power receiving apparatus,
      classify each of the one or more power receiving apparatus into one of a plurality of classes including a first class and a second class based on the acquired user information, and
      decide an amount of transmission power for each of the one or more power receiving apparatuses based on a result of classifying the one or more power receiving apparatus,
   wherein, in a case where the at least one processor classifies a first power receiving apparatus into the first class based on the user information acquired from the first power receiving apparatus and a second power receiving apparatus into the second class based on the user information acquired from the second power receiving apparatus, the at least one processor decides an amount of transmission power for each of the first power receiving apparatus and the second power receiving apparatus so that the amount of transmission power for the first power receiving apparatus is more than the amount of transmission power for the second power receiving apparatus, and
   wherein the power transmitting unit transmits power to the one or more power receiving apparatus in accordance with the decided power amount.

2. The apparatus according to claim 1,
   wherein the at least one processor decides the amount of transmission power for each of the one or more power receiving apparatus based on a remaining capacity of the battery and a value of transmission power determined based on the user information for each of the one or more power receiving apparatus.

3. The apparatus according to claim 2, wherein the at least one processor decides the amount of transmission power for the one or more power receiving apparatus based on the remaining capacity of the battery and a sum of values of transmission power determined in accordance with a class of each of the one or more power receiving apparatus.

4. The apparatus according to claim 2, wherein, if a value obtained by subtracting a sum of the values of transmission power from the remaining capacity of the battery is less than a predetermined value, the at least one processor selects at least one of the one or more power receiving apparatus based on the user information for the one or more power receiving apparatus and decides an amount smaller than the value as an amount of transmission power to the at least one selected power receiving apparatus.

5. The apparatus according to claim 4, wherein the at least one processor reduces the amount of transmission power in order from one of the one or more power receiving apparatus for which a priority level allocated to each of the one or more power receiving apparatus based on the user information is lowest.

6. The apparatus according to claim 5, wherein if the amount of transmission power for the power receiving apparatus having the lowest priority level is reduced to a predetermined amount, the at least one processor reduces the amount of transmission power for a power receiving apparatus having a second lowest priority level.

7. The apparatus according to claim 2, wherein, if a value obtained by subtracting a sum of the values from the remaining capacity of the battery becomes larger than a predetermined value, and if there is a power receiving apparatus among the one or more power receiving apparatus for which a transmission power amount is decided to be smaller than the value determined for the power receiving apparatus, the at least one processor increases the amount of transmission power for the power receiving apparatus for which the amount of transmission power is smaller than the value, within a range in which the amount of transmission power does not exceed the value.

8. The apparatus according to claim 7, wherein, if there are a plurality of power receiving apparatuses for each of which the amount of transmission power is smaller than the value, the at least one processor increases the amount of transmission power in order from a power receiving apparatus for which a priority level allocated to each of the plurality of power receiving apparatuses is highest.

9. The apparatus according to claim 8, wherein, if the amount of transmission power for the power receiving apparatus having the highest priority level is equal to the value of the power receiving apparatus, the at least one processor increases the amount of transmission power for a power receiving apparatus having a second highest priority level.

10. The apparatus according to claim 2, further comprising:
    a power receiving circuit capable of receiving power from another power transmitting apparatus,
    wherein, when the power receiving circuit is receiving power, the at least one processor decides the amount of transmission power for each of the one or more power receiving apparatus based on the value of transmitting power for each of the one or more power receiving apparatus and a power transmission capability of the power transmitting apparatus, and when the power receiving circuit is not receiving power, the at least one processor decides the amount of transmission power for each of the one or more power receiving apparatus based on the value of transmission power for each of the one or more power receiving apparatus and the remaining capacity of the battery.

11. The apparatus according to claim 1, wherein the at least one processor is configured to decide not to transmit power to each of the one or more power receiving apparatus in a case where a remaining amount of the battery before starting transmission of power to each of the one or more power receiving apparatus is less than a threshold.

12. The apparatus according to claim 11, wherein the threshold is settable thorough a user operation.

13. The apparatus according to claim 1:
    wherein the at least one processor decides, as the amount of transmission power for each of the one or more power receiving apparatus, a second amount of power obtained by decreasing a first amount of transmission power determined based on the user information so that a remaining capacity of the battery when transmission of power by the power transmitting circuit is completed is not less than a threshold.

14. The apparatus according to claim 1, further comprising:
wherein the at least one processor decides, based on the user information, a power receiving apparatus from among the one or more power receiving apparatus, to which an amount of power to be transmitted is increased or decreased compared to another power receiving apparatus in the one or more power receiving apparatus.

15. The apparatus according to claim 1, wherein the at least one processor (i) classifies a power receiving apparatus corresponding to the acquired user information into the first class in a case where the power receiving apparatus and the power transmitting apparatus are determined to be used by the same user, and (ii) classifies the power receiving apparatus corresponding to the acquired user information into the second class in a case where this power receiving apparatus and the power transmitting apparatus are determined not to be used by the same user.

16. The apparatus according to claim 1, wherein the at least one processor (i) classifies the power receiving apparatus corresponding to the acquired user information into the first class in a case where a user corresponding to the user information is determined to be using a certain service, and (ii) classifies the power receiving apparatus corresponding to the acquired user information into the second class in a case where a user corresponding to the user information is determined not to be using the certain service.

17. The apparatus according to claim 1, wherein the at least one processor decides an amount of transmission power for each of the one or more power receiving apparatuses so that a remaining capacity of the battery when transmission of power by the power transmitting circuit is completed is not less than a threshold.

18. A control method of a power transmitting apparatus that includes a battery, a power transmitting circuit configured to transmit power to one or more power receiving apparatus using power from the battery, at least one processor, and a memory, the method comprising:
acquiring user information for identifying a user from each of the one or more power receiving apparatus;
classifying each of the one or more power receiving apparatus into one of a plurality of classes including a first class and a second class based on the acquired user information; and
deciding an amount of transmission power for each of the one or more power receiving apparatus based on a result of the classifying of the one or more power receiving apparatuses,
wherein, in a case where the at least one processor classifies a first power receiving apparatus into the first class based on the user information acquired from the first power receiving apparatus and a second power receiving apparatus into the second class based on the user information acquired from the second power receiving apparatus, deciding an amount of transmission power for each of the first and the second power receiving apparatus so that the amount of transmission power for the first power receiving apparatus is more than the amount of transmission power for the second power receiving apparatus, and
transmitting power to the one or more power receiving apparatus in accordance with the decided power amount.

19. A non-transitory computer-readable storage medium storing a computer program which causes a computer of a power transmitting apparatus that includes a battery a power transmitting circuit configured to transmit power to one or more power receiving using power from the battery to execute:
acquiring user information for identifying a user from each of the one or more power receiving apparatus;
classifying each of the one or more power receiving apparatus into one of a plurality of classes including a first class and a second class based on the acquired user information; and
deciding an amount of transmission power for each of the one or more power receiving apparatus based on a result of the classifying of the one or more power receiving apparatuses,
wherein, in a case where the at least one processor classifies a first power receiving apparatus into the first class based on the user information acquired from the first power receiving apparatus and a second power receiving apparatus into the second class based on the user information acquired from the second power receiving apparatus, deciding an amount of transmission power for each of the first and the second power receiving apparatus so that the amount of transmission power for the first power receiving apparatus is more than the amount of transmission power for the second power receiving apparatus, and
transmitting power to the one or more power receiving apparatus in accordance with the decided power amount.

* * * * *